United States Patent [19]

Hirayama

[11] Patent Number: 5,267,327
[45] Date of Patent: Nov. 30, 1993

[54] APPARATUS AND METHOD FOR REGISTERING THE HANDWRITING OF A USER SO IT CAN BE TRANSLATED INTO BLOCK CHARACTERS

[75] Inventor: Tomoshi Hirayama, Tokyo, Japan

[73] Assignee: Sony Corporation, Tokyo, Japan

[21] Appl. No.: 32,461

[22] Filed: Mar. 15, 1993

Related U.S. Application Data

[63] Continuation of Ser. No. 677,117, Mar. 29, 1991, abandoned.

[30] Foreign Application Priority Data

Mar. 30, 1990 [JP] Japan .................................. 2-084317
May 31, 1990 [JP] Japan .................................. 2-142530

[51] Int. Cl.$^5$ .............................................. G06K 9/00
[52] U.S. Cl. ........................................ 382/13; 382/14; 382/57
[58] Field of Search .................... 382/3, 13, 14, 57, 59, 382/62; 364/705.03, 709.11; 178/18

[56] References Cited

U.S. PATENT DOCUMENTS 4,839,634  6/1989  More et al. ......................... 340/712
4,972,496  11/1990 Sklarew ................................ 382/13
5,191,622  3/1993  Shojima et al. ....................... 382/13

FOREIGN PATENT DOCUMENTS 0254561  1/1988  European Pat. Off. .
57-212586 12/1982 Japan .
0044586  2/1989  Japan .................................... 382/13
2-32488   2/1990  Japan .
2193023  1/1988  United Kingdom ................... 382/13

Primary Examiner—Leo H. Boudreau
Assistant Examiner—Andrew W. Johns
Attorney, Agent, or Firm—Hill, Steadman & Simpson

[57] ABSTRACT

An information processing apparatus with a hand-writing character recognition function includes an input device having a pen and tablet for inputting a user's hand-writing character information, and a selecting device for selecting a desired block type character on the basis of the hand-writing character information, selection of the block type character (corresponding to the hand-writing character information) being effected by the hand-writing character recognition function. A detecting device detects a similarity condition between first and second hand-written characters initially input by the user on the input device, and hand-writing character information for the user based on the first and second hand-written character is registered if the similarity condition was detected. Subsequently, if the user inputs a hand-written character similar to the user's registered hand-writing character information, the input hand-written character is translated into the desired block type character.

11 Claims, 24 Drawing Sheets

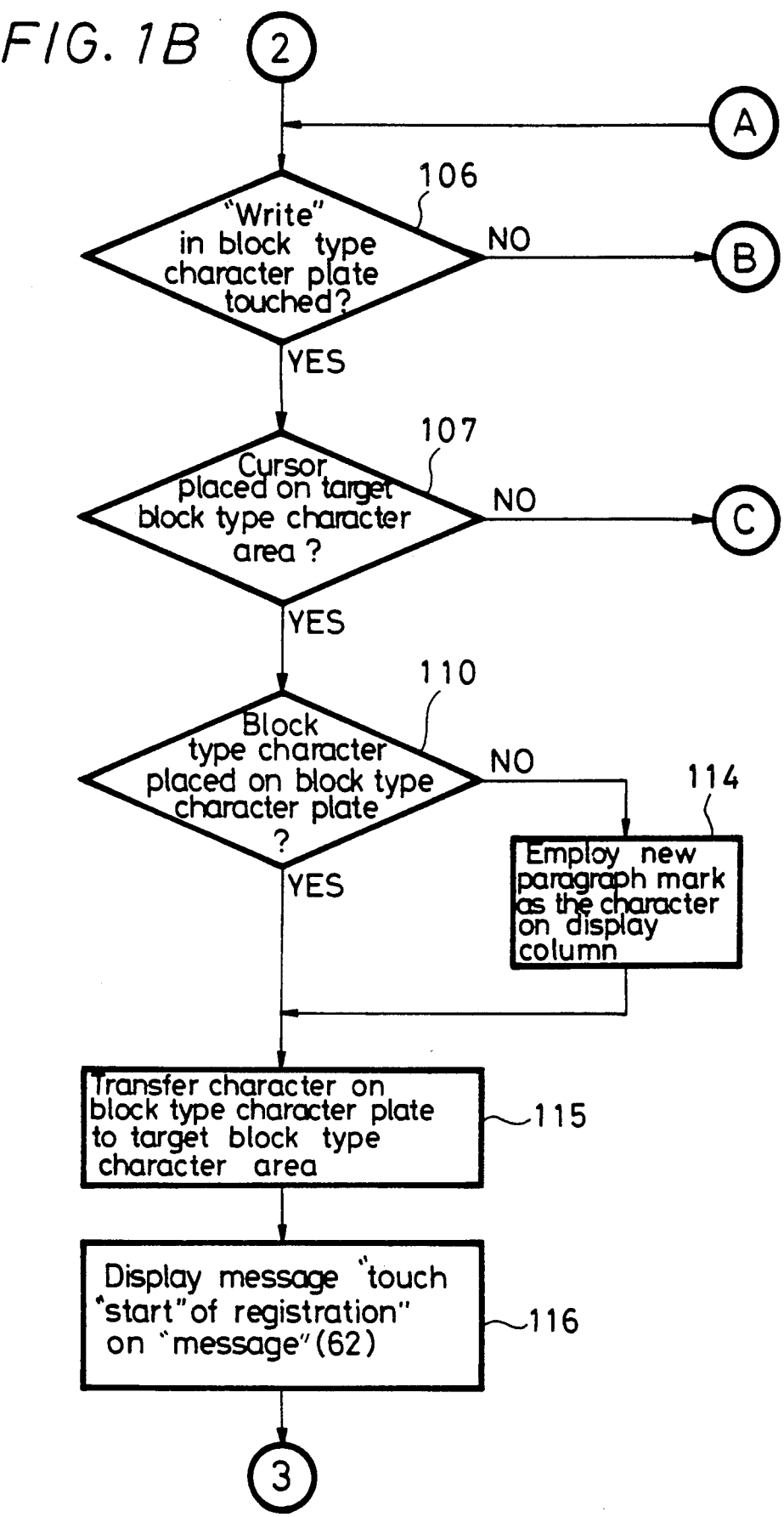

APPARATUS AND METHOD FOR REGISTERING THE HANDWRITING OF A USER SO IT CAN BE TRANSLATED INTO BLOCK CHARACTERS

This is a continuation of application Ser. No. 07/677,117, filed Mar. 29, 1991 now abandon.

BACKGROUND OF THE INVENTION

1. Field of the Invention

The present invention relates generally to information processing and, more particularly, is directed to an information processing apparatus and an information processing method utilizing a character recognition function and which can, for example, be applied to a very small portable computer having a touch pen.

2. Description of the Prior Art

Information processing apparatus, in the form of very small computers or the like, is becoming increasingly popular. This kind of information processing apparatus typically has a simple word processing function and an information processing function utilizing a touch pen to write, store and read personal information such as that equivalent to an address book involving telephone numbers and further information such as a diary.

In order to make this information processing apparatus more versatile, it has been proposed for the apparatus to be provided with a user hand-written character dictionary function in addition to a pattern recognition function for recognizing a hand-written pattern prepared by the manufacturer and a user input pattern. According to the user hand-written character dictionary function, simplified strokes related to the writing habits of a writer are registered beforehand in the user hand-written character dictionary and then the registered hand-written strokes and the simplified hand-written strokes which can be input with ease are recognized by means of a pattern recognition technique. In accordance with this pattern recognition, the corresponding character is read out and an image of the read-out character can be displayed.

Such information processing apparatus having a user character dictionary function has previously been proposed in Japanese Patent Application No. 1-307275, filed in the name of the assignee of the present application. This previously-proposed apparatus is provided with a character recognition learning function means mainly formed of a data base in which a character recognition dictionary is generated from the writer's hand-written strokes and stored.

However, the above previously-proposed character recognition apparatus is relatively large in scale and cannot be applied to a very small portable computer without difficulty.

In small computers or the like for Japanese use, when the user character dictionary is formed, JIS (Japanese Industrial Standards) kanji codes are input by using ten keys or by using a touch pen or the like. In that case, a kanji code table stored in a document or in suitable apparatus becomes necessary, the use of which is troublesome. When hand-written strokes are then registered in the user hand-written character dictionary, it becomes necessary to determine whether or not a desired hand-written stroke is registered. In that case, a known echo back means (re-image display) may be utilized, and when such echo back means is not utilized, it is very difficult to determine whether or not the registered hand-written stroke is input correctly and in the prescribed writing order required by the recognition process; for example, it may be very difficult to determine whether or not the hand-written character is written in fluent form. In present-day small computers, when the user hand-written dictionary is formed, the registration of hand-written characters is not easy and the operation lacks reliability. Accordingly, in the above-mentioned small computer, there is the disadvantage that the editing of data cannot be performed reliably.

SUMMARY OF THE INVENTION

Accordingly, it is an object of the present invention to provide an improved information processing apparatus in which the above-mentioned shortcomings and disadvantages encountered with the prior art can be eliminated.

More specifically, it is an object of the present invention to provide an information processing apparatus in which a hand-writing pattern for making a user hand-writing dictionary can be registered accurately and readily.

It is another object of the present invention to provide an information processing apparatus in which editing of data can be performed more conveniently.

It is a further object of the present invention to provide an information processing apparatus which can be applied to a very small portable computer.

According to a first aspect of the present invention there is provided an information processing apparatus with a hand-writing character recognition function, the apparatus comprising input means comprising pen means and a tablet for inputting hand-writing character information of a user, selecting means for selecting a desired block type character on the basis of the hand-writing character information, selection of the block type character corresponding to the hand-writing character information being effected by the hand-writing character recognition function, detecting means for detecting a similarity condition between first and second hand-written characters input by the user on the input means, the first and second hand-written characters relating to a particular block type character, and registering means for registering the user's hand-writing character information based on the first and second hand-written characters in response to detection of the similarity condition by the detecting means, wherein after input by the user of a hand-written character similar to the user's registered hand-writing character information, the input hand-written character is translated into the desired block type character.

According to a second aspect of the present invention there is provided an information processing method using a hand-writing character recognition function, the method comprising the steps of selecting a desired block type character on the basis of input hand-writing character information, selection of the block type character corresponding to the hand-writing character information being effected by the hand-writing character recognition function, inputting a first hand-written character by a user on input means, inputting a second hand-written character by the user on the input means, detecting a similarity condition between the first and second hand-written characters, and registering the user's hand-writing character information based on the first and second hand-written characters in response to detection of the similarity condition, wherein after input by the user of a hand-written character similar to the user's registered hand-writing character information, the input hand-written character is translated into the desired block type character.

The above, and other objects, features and advantages of this invention will be apparent from the following detailed description of illustrative embodiments which is to be read in connection with the accompanying drawings, in which like reference numerals are used to identify the same or similar parts in the several views.

DESCRIPTION OF THE PREFERRED EMBODIMENTS

An embodiment of an information processing apparatus according to the present invention will hereinafter be described with reference to FIGS. 1 to 5.

The arrangement and operation of the apparatus shown in FIGS. 3 and 4 will be explained first.

Figure 3:
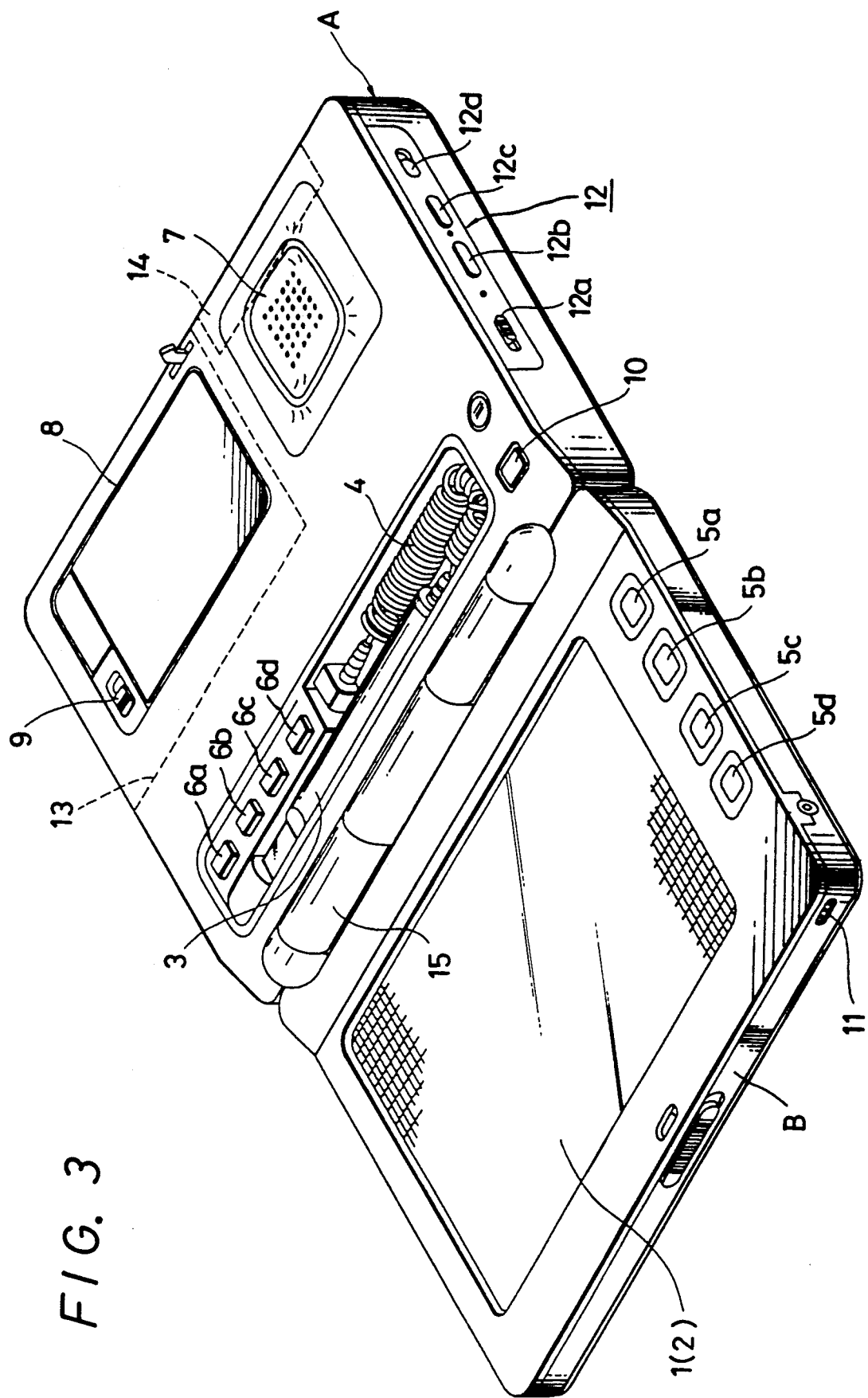
FIG. 3 is a perspective view illustrating an information processing apparatus according to an embodiment of the present invention.

FIG. 3 is a perspective view of information processing apparatus according to an embodiment of the present invention, which apparatus is applied to a small portable computer simply hereinafter referred to as an apparatus.

The apparatus of FIG. 3 may have a word processing function, an address book function including, for example, telephone number, address, name and the like, a schedule function including, for example, memorandum, time, calendar display and the like, a recording and reproducing function, a dual tone generating function for a so-called push button phone, and an edit function relating to storing, reading and correcting information associated with these or other functions.

As shown in FIG. 3, the apparatus includes a housing assembly comprising a pair of foldable and unfoldable housings A and B. The housing B has a display unit 1 typically in the form of a liquid crystal display (LCD) unit, and this display unit 1 is connected to a signal processing section (not shown) which includes a microprocessor unit (MPU) incorporated within the apparatus, for displaying image data provided by signal processing in the signal processing unit. The display unit 1 has on its surface an input tablet 2 typically of an electrostatic capacitance type which may comprise a transparent touchsensitive device or the like so that the image data displayed on the display unit 1 can be visually confirmed with ease. A pen 3, which can, as shown, be stored in a suitable recess in the other housing A when not in use, coacts with the input tablet 2 for inputting desired data into the apparatus. When the pen 3 is removed from the housing A, and its point is brought into contact with the surface of the input tablet 2 at a certain position, information signals concerning the function selection, locus of movement of the point of the pen 3, a selected character or the like, are input to the signal processing unit via a cord 4 or some other means.

Keyswitches 5a, 5b, 5c, 5d and 6a, 6b, 6c, 6d are provided on the housings A and B, and these keyswitches are connected to the signal processing unit for effecting predetermined functions.

The housing A also has a loudspeaker 7 for producing audible signals, and a battery case 8 for storing therein a battery. The battery case 8 is normally closed by a lid which can be opened when it is released by a lock mechanism 9 associated therewith. Various electronic circuits and components (not shown) in the housings A and B are energized when a power supply switch 10 is turned on.

The housing B has a microphone 11 on an outer edge thereof for picking up voice or other audible messages to be recorded in a solid state recording manner. The housing A has on one side edge thereof an operation key group 12 for recording/reproducing desired voice messages. The key group 12 includes a recording key 12a, a playback key 12b, a stop key 12c and a volume key 12d for adjusting the level of sound to any one of high, medium and low levels. When these keys 12a, 12b, 12c, 12d are selectively depressed or shifted, a voice message picked up by the microphone 11 is recorded, or a recorded voice message can be reproduced by the loudspeaker 7.

The housing A also has at portions shown by broken lines a socket 13 for receiving an integrated circuit (IC) card such as that of a read only memory (ROM), a random access memory (RAM) or the like, for expanding functions, and an expansion socket 14 for connection to an external device (not shown) such as a printer or a modem.

The housings A and B are foldably interconnected by a hinge 15 which includes therein a flexible board (not shown) or the like for transmitting signals between the respective parts accommodated in the housings A and B. Therefore, due to the flexible board, the housings A and B can be folded together for storage and unfolded about the hinge 15 so as to be spread out for use, without electrical problems such as disconnection between electronic circuits and components in the housings A and B. In one example, the apparatus when unfolded has a longitudinal dimension of about 29 cm and a transverse dimension of about 20.5 cm, and has a thickness of about 4 cm when folded. The display unit 1 has a width of about 15 cm and a height of about 10 cm.

Figure 4:
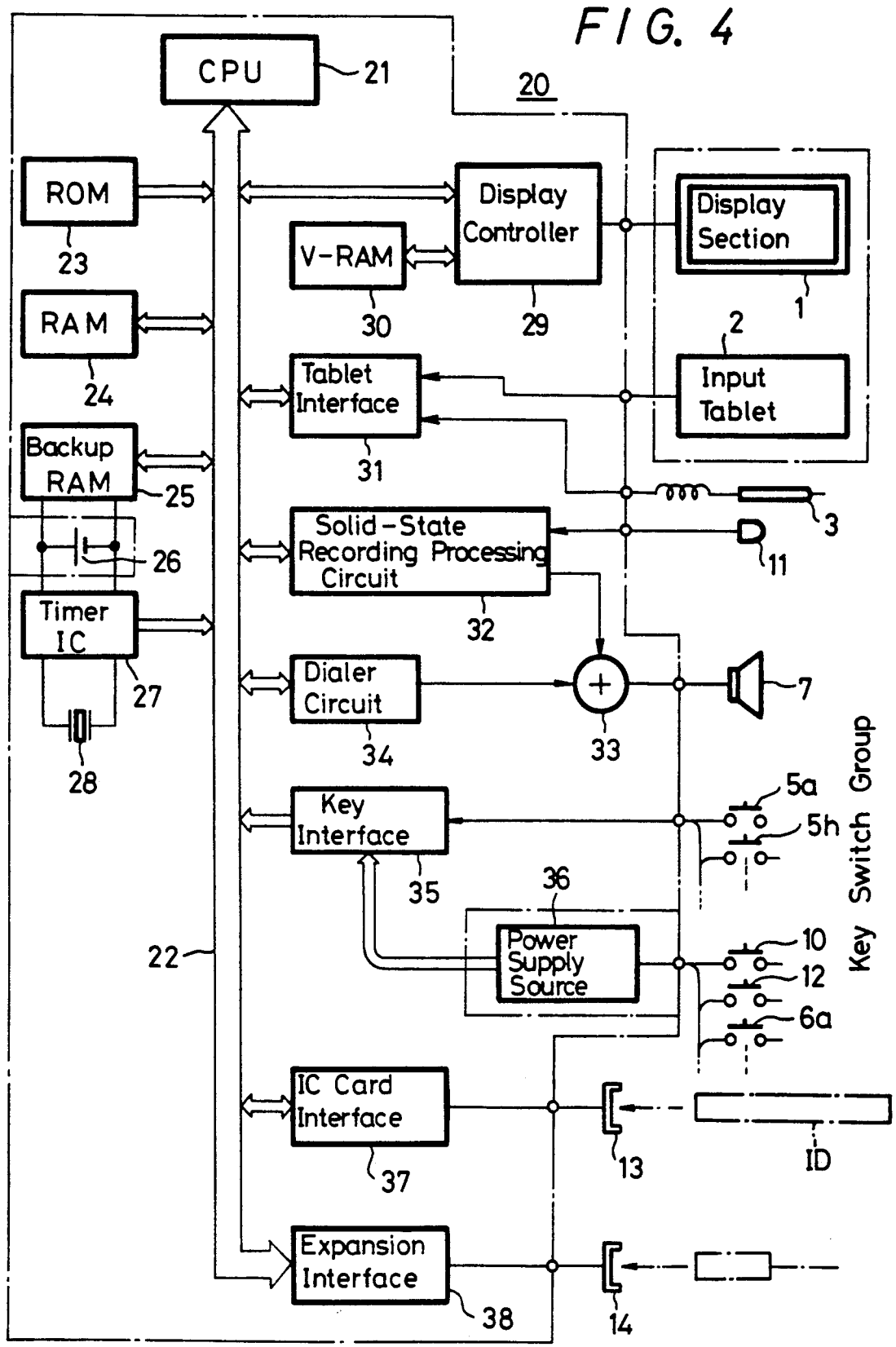
FIG. 4 is a schematic block diagram showing a signal processing section of the information processing apparatus and particularly illustrating the connected condition of the signal processing section and the respective portions shown in FIG. 3.

The apparatus has an electronic hardware arrangement as shown in FIG. 4. A signal processing section 20 includes a central processing unit (CPU) 21 to which various components typically in the form of ICs are connected via a bus 22.

A ROM 23 connected to the bus 22 stores various programs including a system program for controlling the operation of the apparatus, a kana-kanji conversion program for a Japanese language word processing function, dictionary data therefor, a character recognition program associated with a fuzzy logic theory for recognizing hand-written characters, dictionary data therefor, and other data.

A RAM 24 for providing a work area, a backup RAM 25 and a timer IC 27 which are energized by a battery 26 are also connected to the bus 22.

The timer IC 27 counts clock pulses generated by a timing generator (not shown) on the basis of the frequency of a quartz oscillator 28, and constantly produces present time data relative to the year, month, date and time to the bus 22.

The hardware of the signal processing unit 20 will be explained more fully with reference to interconnection with the respective portions of the apparatus shown in the perspective view of FIG. 3.

As shown in FIG. 4, the display unit 1 is controlled by a display controller 29 which is itself controlled via the bus 22 by the CPU 21. Display data generated by the CPU 21 are supplied to the display and written into a video RAM (V-RAM) 30 by means of the display controller 29. The display data stored in the V-RAM 30 are then supplied to the display unit 1 under the control of the display controller 29.

The input tablet 2 (combined with the display unit 1) and the pen 3 are connected to the bus 22 through a tablet interface 31. A signal corresponding to the change in electrostatic capacitance when the input tablet 2 is touched by the point of the pen 3 is input to the apparatus through the tablet interface 31. Therefore, signals representing information as to selection of a desired function, figure of locus when the point of the pen 3 is moved on the surface of the input tablet 2, characters and the like, are supplied to the CPU 21 via the bus 22.

A solid-state recording processor circuit 32 is connected to the bus 22 to process the audio signal of the voice message picked up by the microphone 11 in a predetermined manner such as an analog-to-digital (A/D) conversion into a digital signal, which is stored (recorded) in the backup RAM 25 under the control of the CPU 21 via the bus 22. When the voice signal data stored in the backup RAM 25 are retrieved, they are converted by the solid-state recording processor circuit 32 into an analog signal, which is supplied through a mixer 33 to the loudspeaker 7.

A dialer circuit 34 is connected between the bus 22 and the mixer 33, and the dialer circuit 34 produces an audio signal which corresponds to a dual tone signal of a push-button dialing system, in response to data indicative of a desired phone number from the CPU 21. The audio signal is supplied from the dialer circuit 34 through the mixer 33 to the loudspeaker 7.

A key interface circuit 35 is connected to the bus 22 and is supplied with signals from the key switches 5a to 5d, 6a to 6d, the power supply switch 10 and the key pad 12 directly or through a power supply circuit 36. In the key interface circuit 35, the signals are converted into a form which can be read by the CPU 21. Signals from the power supply switch 10, the key switches 6a to 6d, the key pad 12 except for the stop key 12c, are supplied to the key interface circuit 35 through the power supply circuit 36. When any one of these key switches is actuated, the power supply circuit 36 is first turned on, and thereafter the signal from the operated key switch is supplied to the key interface circuit 35.

Interfaces 37, 38 for connection to an IC card and an external circuit which are, respectively, to be connected by way of the sockets 13, 14 are connected to the bus 22.

Operation of the information processing apparatus will now be described. First, registration of hand-written characters to the user hand-written dictionary which have been stored in the ROM 23 by the CPU 21 will be described with reference to flowcharts forming FIGS. 1 and 2 and schematic diagrams of display pictures forming FIGS. 5A to 5O.

In the following description, "pen-down" means that a coordinate point indicated by the point of the pen 3 is detected by touching the input tablet 2 with, for example, the point of the pen 3 and various operations (for example, operation to display the locus of the pen 3, operation for designating and extracting icons and so on which will be referred to later) are set in the enabled condition. In the key operation or the like, the pen-down means that the associated key is operated on the coordinate at which the point of the pen 3 is touched.

The existence or absence of the pen-down state may be detected by any of the following known methods. The point of the pen or the tablet or the like may be provided with a switch means such as a microswitch or the like, wherein the on-off condition of the switch means is detected by contact or depression of the pen against the input tablet, or the pen-down state may be detected by determining whether change in the magnetic field or change in the electrostatic capacity exceeds a particular threshold level or not.

The "pen-up" state means that the pen is out of contact with the input tablet or the like, and therefore, the pen-up state is detected by a method opposite to that of the pen-down state. More specifically, if the switch is turned on in the pen-down state, this switch is turned off by the pen-up operation. For example, in an extracting operation for extracting an icon, the icon is activated as a window and in the key operation, the designated key operation is made definite and executed. The "pen-touch" operation defines a series of operations of pen-down and pen-up. Accordingly, when the key on the tablet is pen-touched, then an operation similar to the standard key operation is effected.

Figure 5A:
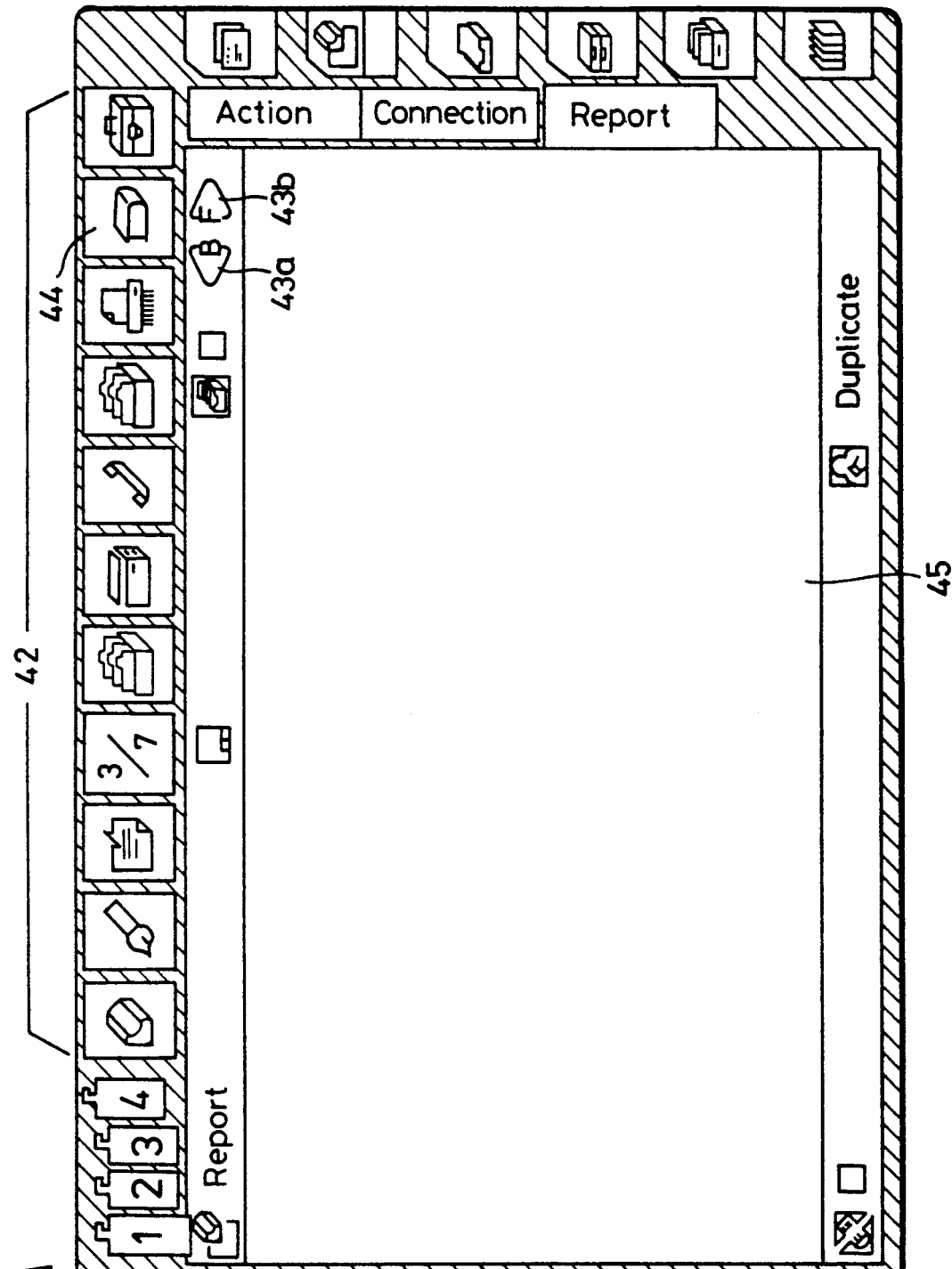
FIGS. 5A to 5O are schematic diagrams of displayed pictures on the display screen of the information processing apparatus, and to which reference will be made in explaining the registration of hand-writing strokes on to the user hand-writing dictionary.

When the power supply switch 10 on the housing A is turned on, an icon array 42 which can be processed and page keys 43a, 43b as well as time (not shown) or the like are displayed on the display unit 1 in response to the function of the apparatus, as shown in FIG. 5A.

When the point of the pen 3 touches the "REPORT" key area of three option key areas "ACTION", "CONNECTION" AND "REPORT" displayed in the icon array 42 on the right-hand side of the display unit 1, a report image 45 is displayed on the display unit 1. A displayed image, such as a character or the like, is omitted as can be seen in FIG. 5A.

Figure 5B:
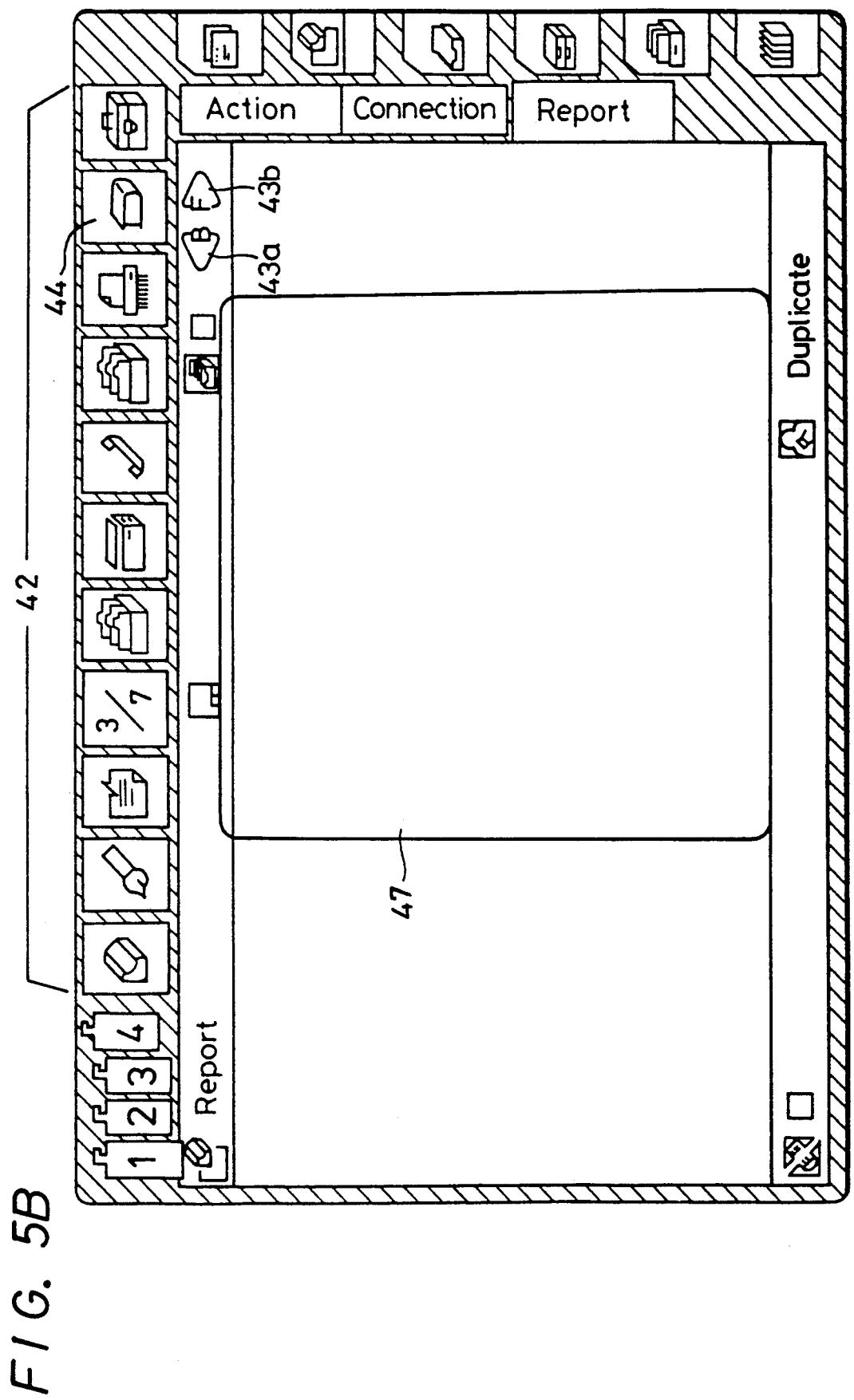

Then, as shown in FIG. 5B, a desired registration icon 44 of the icon array 42 displayed on the upper portion of the report image 45 can be touched with the point of the pen 3, and the display of the registration icon 44 is reversed from white to black. In that case, as shown in FIG. 5B, the point of the pen 3 is not lifted from the input tablet 2 but is moved (dragged) to the position at which a frame 47 of an inverted window's outline, for example an "O" letter shape, is displayed.

Figure 5C:
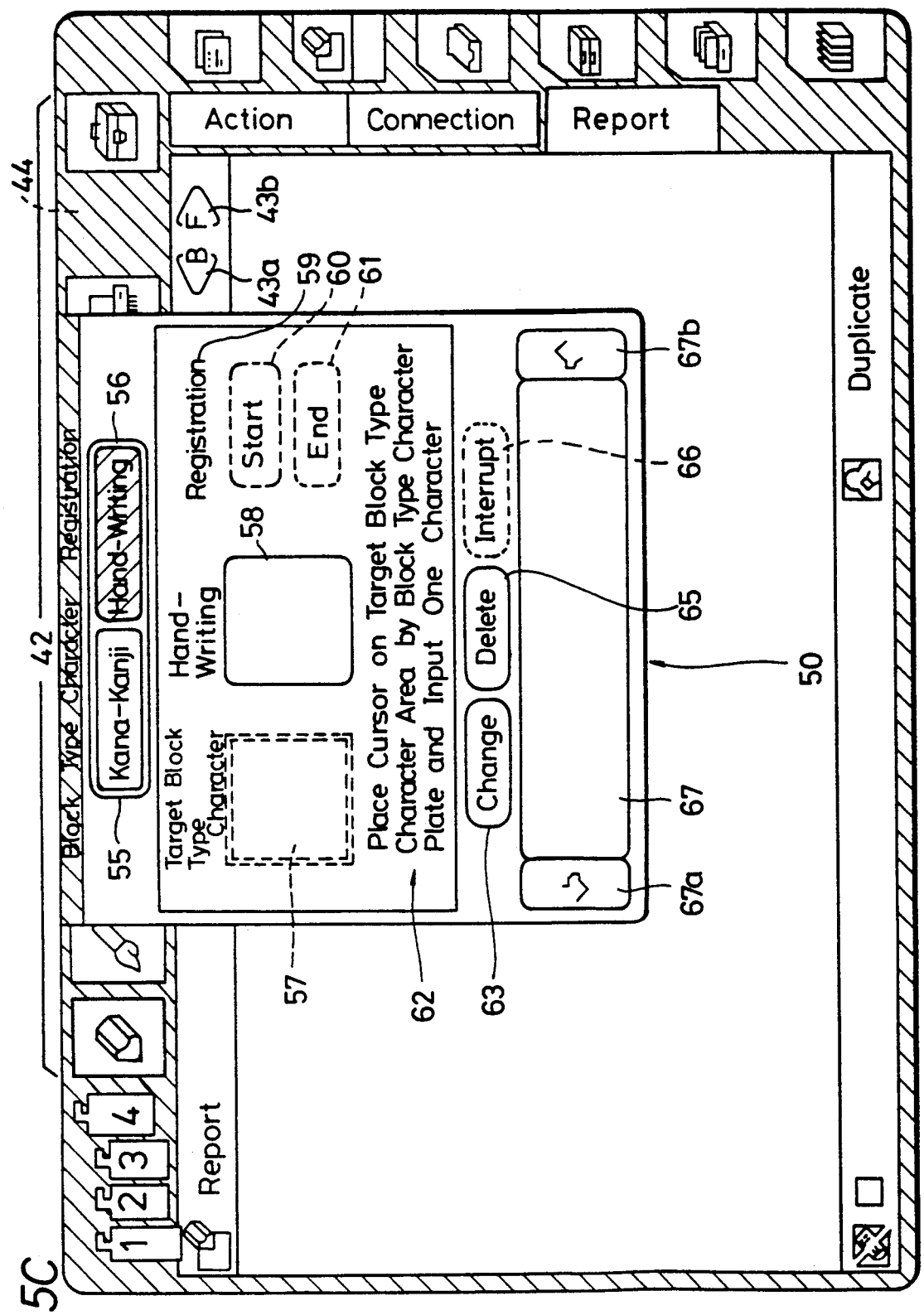

Thereafter, when the point of the pen 3 is lifted from the surface of the input tablet 2, as shown in FIG. 5C, a block type character registration plate 50 (or so-called "tool") indicating the processing contents (functions)

associated with the registration icon 44 in the icon array 42 is automatically extracted and displayed in the form of a so-called window, and the displayed image of the registration icon 44 is erased. The block type character registration plate 50 is for registering the block type or printed characters for subsequent use in character recognition.

A "kana-kanji conversion" key area 55 and a "hand-writing" key area 56, which serve as column key switches and display characters, are provided on the uppermost portion of the block type character registration plate 50. Under the "kana-kanji conversion" key area 55 and the "hand-writing" key area 56, there are provided areas for "target block type character" 57, "hand-writing" 58 and "registration" 59, as well as "start" 60 and "end" 61 key areas under which a "message" area 62 is further provided. Under the "message" area 62, there are further provided a "change" key area 63, a "delete" key area 65 and an "interrupt" key area 66. Beneath the "change" 63, "delete" 65 and "interrupt" 66 key areas, there is provided a "registered block type character display" area 67 in which registered block type characters of a plurality of areas can be selectively displayed by using page buttons 67a and 67b. These functions will be described hereinafter and only the necessary reference numerals will be shown in FIGS. 5B to 5O.

Figure 1A:
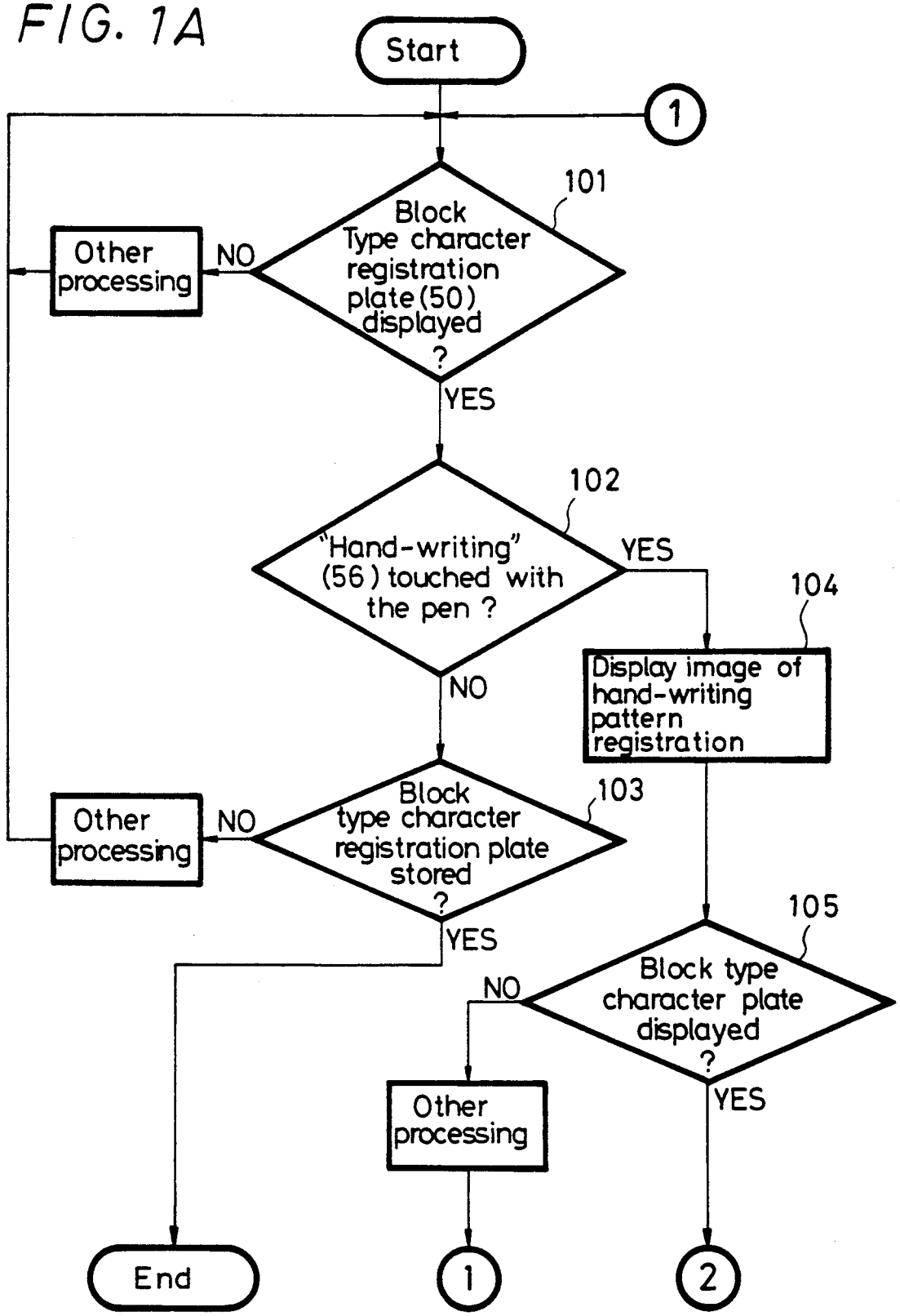
FIG. 1 (formed of FIGS. 1A, 1B and 1C) is a flowchart to which reference will be made in explaining part of an operation of an embodiment of the present invention in which user hand-writing is registered in a user hand-writing dictionary.
Figure 1C:
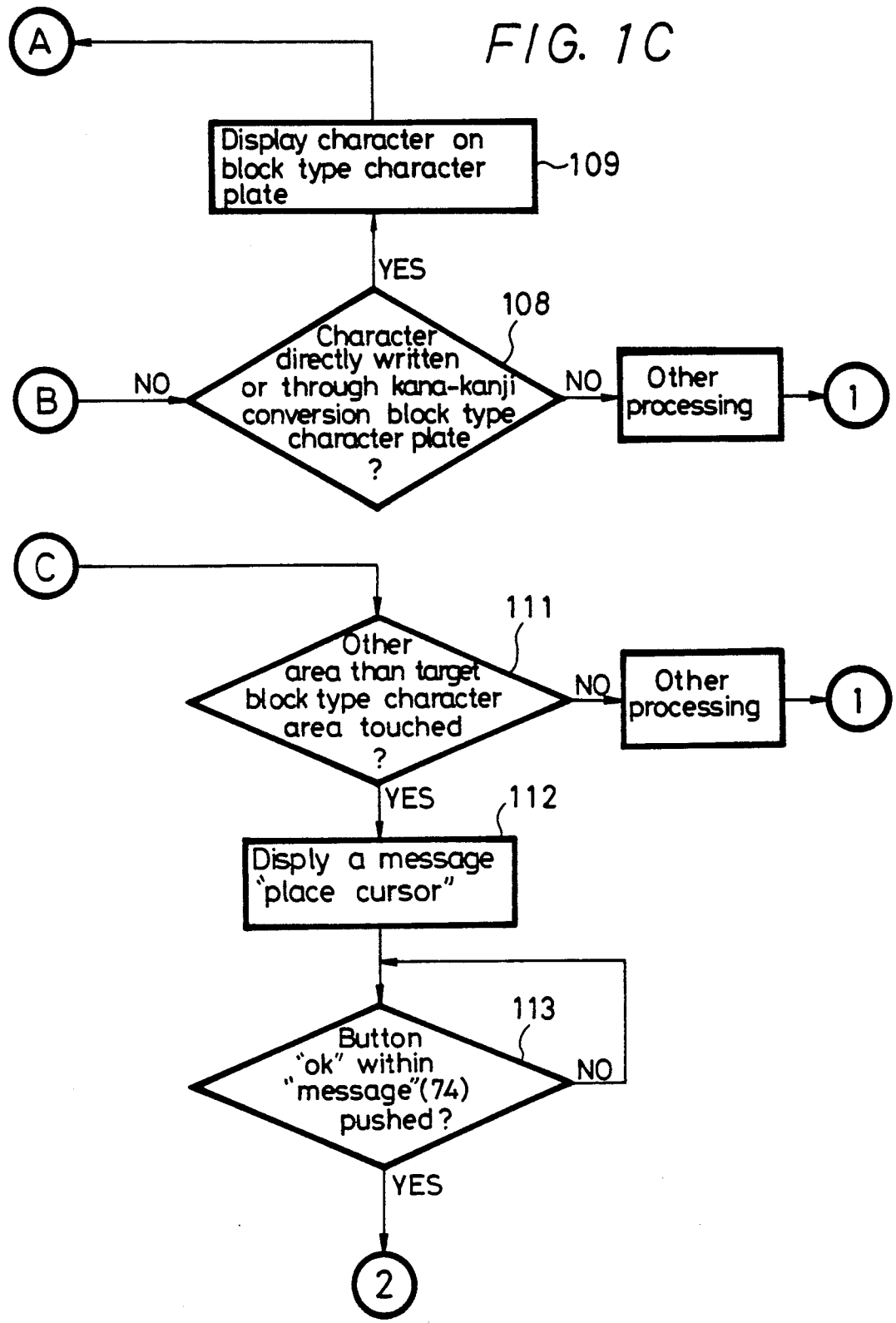

Referring to the flowchart of FIG. 1 (formed of FIGS. 1A, 1B and 1C), following the Start of operation, it is determined in a decision step 101 by the CPU 21 whether or not the block type character registration plate 50 is displayed. If YES is output at the step 101, then the processing proceeds to a decision step 102, while if NO is output at the step 101, then other processing is performed before the process returns to the state prior to the step 101, whereupon the above-mentioned decision is repeated. It is determined in the decision step 102 whether or not the "hand-writing" key area 56 on the block type character registration plate 50 is being touched with the point of the pen 3. If YES is output at the step 102, the display of the "hand-writing" key area 56 is reversed from white to black and the processing proceeds to a decision step 104. If NO is output at the step 102, then the processing proceeds to a step 103. It is determined in the decision step 103 whether the block type character registration plate 50 is stored or not. If NO is output at the step 103, then other processing is performed before the process returns to the state prior to the step 101, and then the step 101 and the following processing steps of the program are executed again. If YES is output at the step 103, then the processing is ended and the aforementioned programs are ended.

In the step 104, the registration icon 44 in the icon array 42 is erased as shown in FIG. 5C, and images of the "registration" area 59, the "change" key area 63 and the "delete" key area 65 of the hand-writing pattern are displayed. In that event, a message "place cursor on target block type character area by block type character plate and input one character" is displayed on the "message" area 62 as shown in FIG. 5C.

Figure 5D:
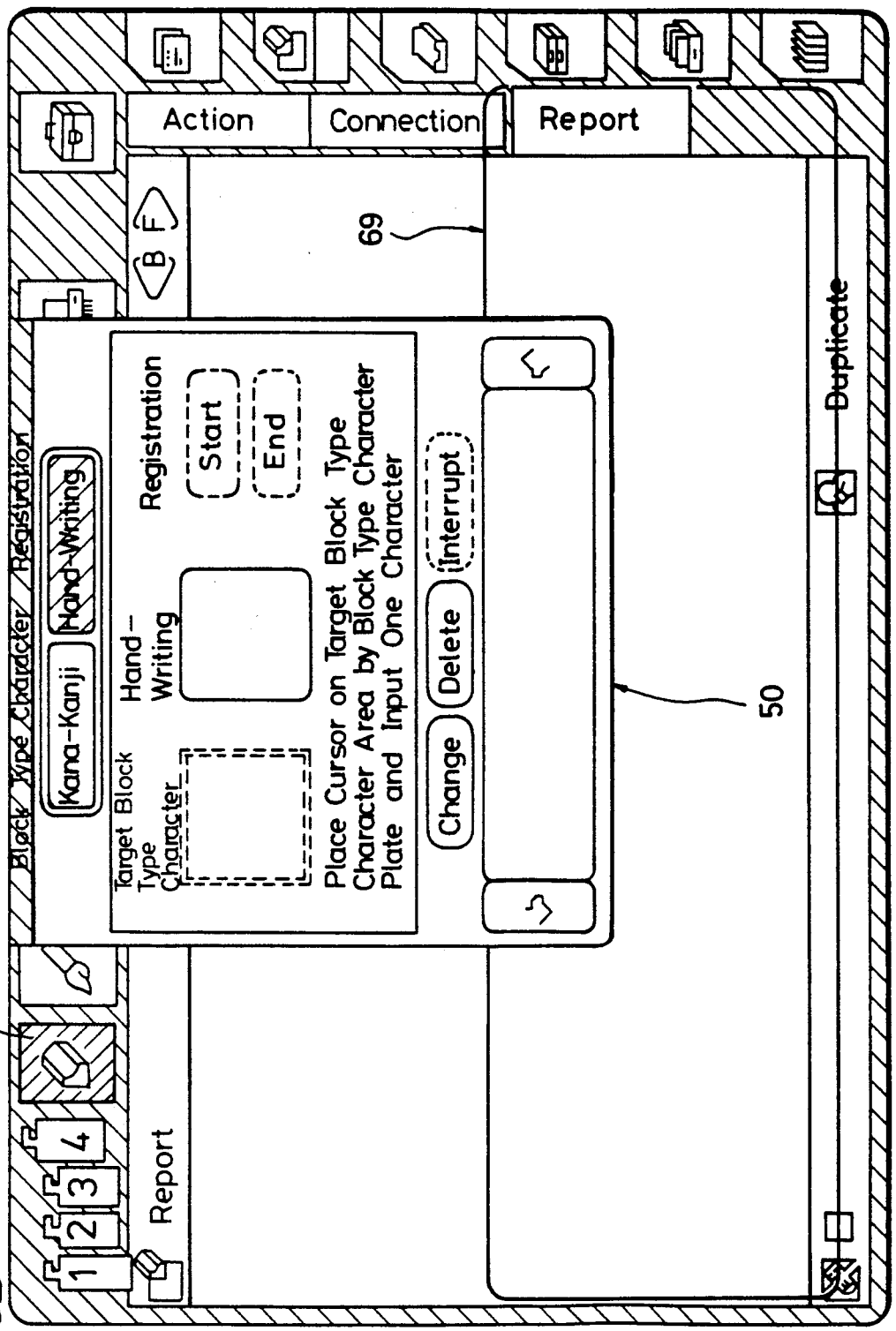
Figure 5E:
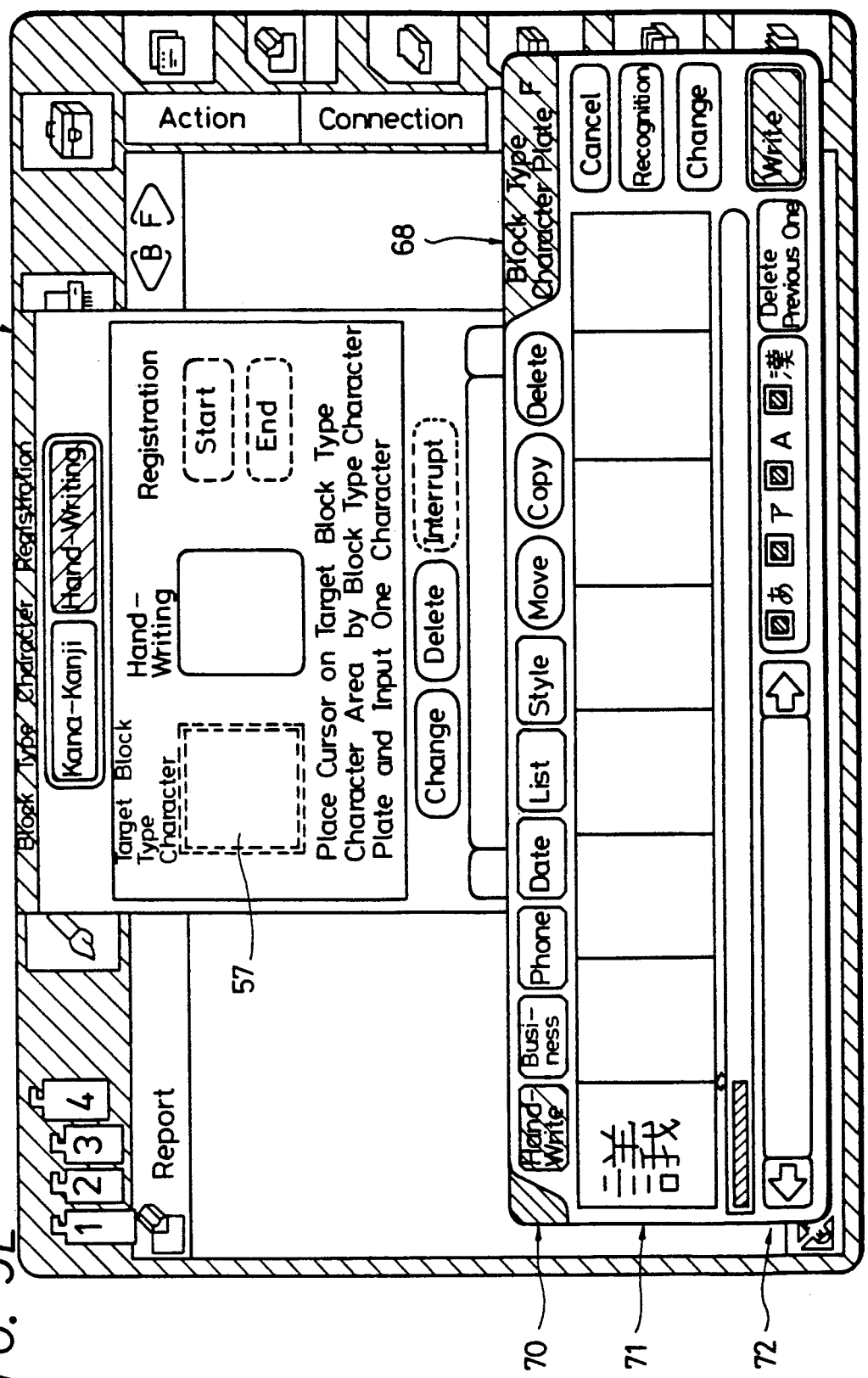

In a step 105, when a block type character icon 64 in the icon array 42 is touched with the point of the pen 3 and moved by dragging the point of the pen 3 along the input tablet 2, the block type character icon is enlarged in the form of a window and a frame 69 indicating the display position is displayed as shown in FIG. 5D; also the block type character icon 64 of the icon array 42 is covered with a half tone mesh. If the point of the pen 3 is lifted from the input tablet 2 at a desired position, the "registered block type character" area 67 is displayed over the block type character registration plate 50 and at the position of the frame 69 in an enlarged scale, as shown in FIG. 5E, to form a block type character plate 68. At that time, the block type character icon 64 is erased. It is determined in the decision step 105 by the CPU 21 whether the block type character plate 68 is displayed or not. If NO is output at the decision step 105, then other processing is executed and the processing returns to the step 101, and then the step 101 and the following steps are executed one more time. If YES is output at the step 105, then the processing proceeds to a decision step 106, shown in FIG. 1B.

As seen from FIG. 5E, on the block type character plate 68, there is provided a function selection key array 70 which comprises "hand-write", "business", "phone", "date", "list", "style", "move", "copy", "delete", "cancel", "recognition", "change" and "write" keys from the left uppermost portion to the righthand side. Below the function selection key array 70, a display row 71 is provided, in which the Japanese character corresponding to the character on the "target block type character" area 57 is written and displayed. A selection key array 72 which is composed of hiragana (あ), katakana (ア), alphabet (A) and Japanese character (字), keys is provided on the lower portion of the display column 71.

Figure 5F:
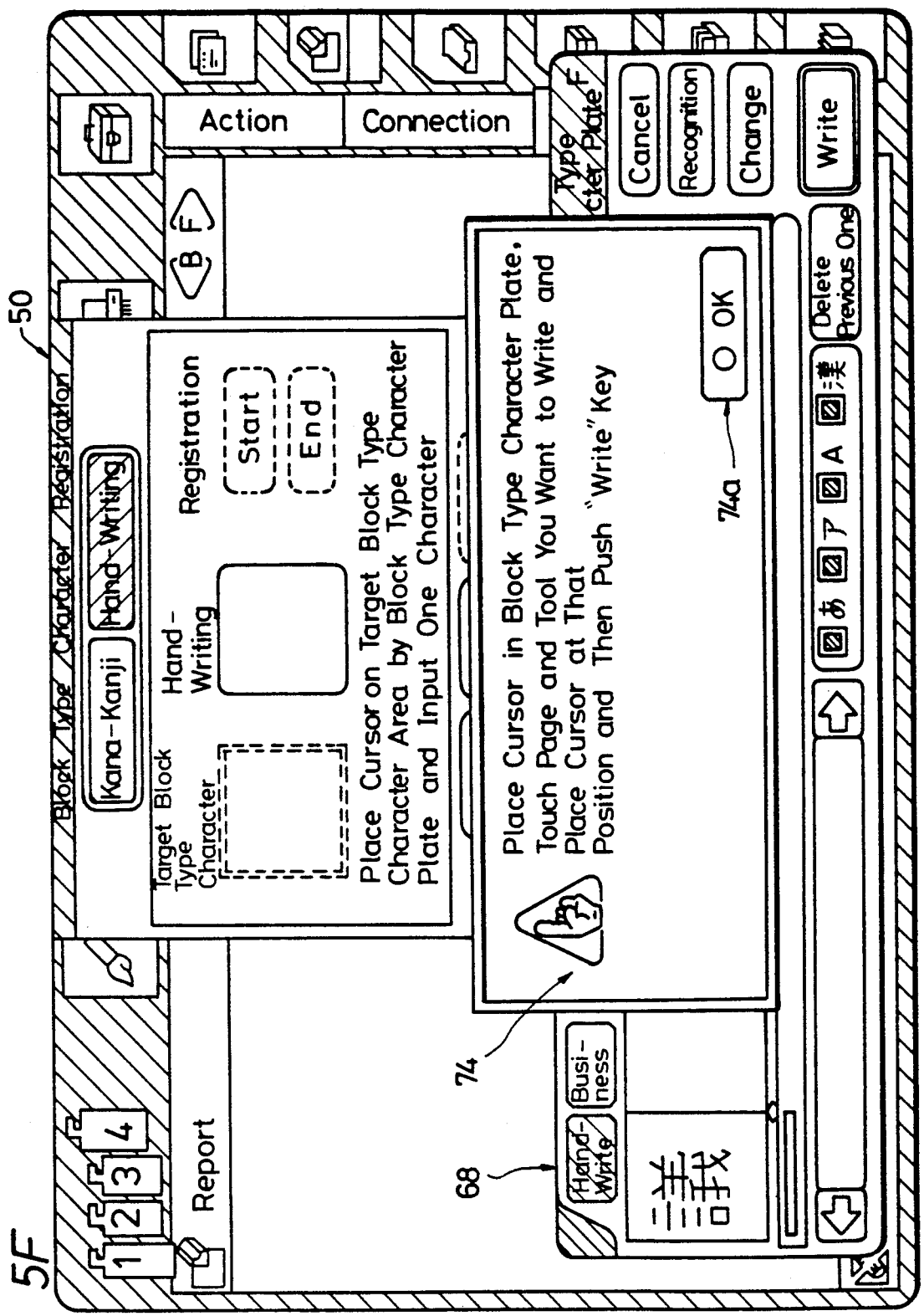
Figure 5G:
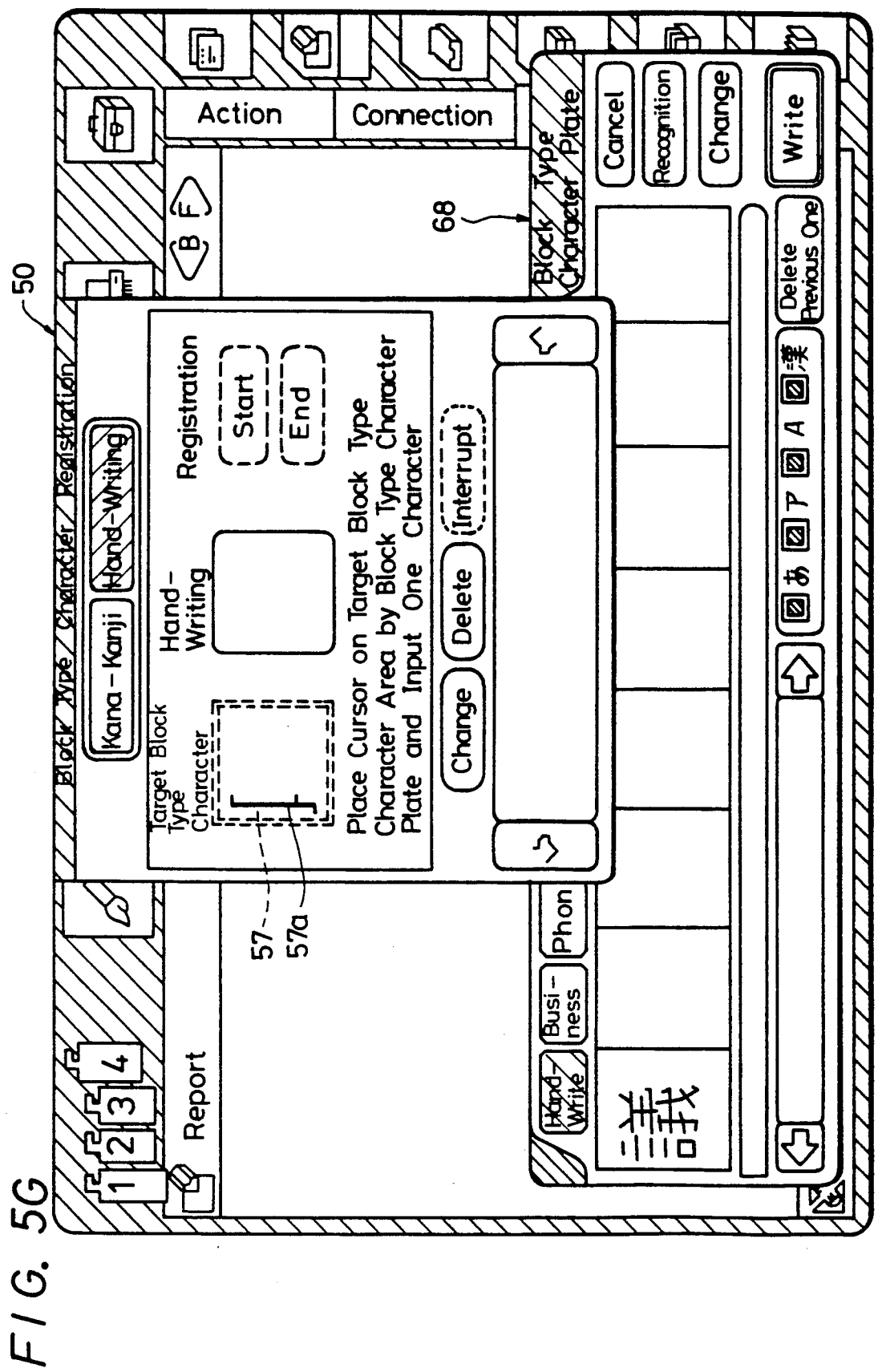

Referring back to the flowchart of FIG. 1B, it is determined in the decision step 106 by the CPU 21 whether or not the "write" key in the block type character plate 68 is being touched with the point of the pen 3. If so, the "write" key is covered with a half tone mesh, as shown in FIG. 5E. If YES is output at the step 106, then the processing proceeds to a decision step 107, but if on the other hand NO is output at the step 106, then the processing proceeds to a decision step 108 in which it is determined whether a character is to be written directly or by using the kana-kanji conversion function in the display row 71 of the block type character plate 68. In this example, as shown in FIG. 5E, a Japanese character as illustrated is input to the display row 71. If YES is output at the step 108, then the processing proceeds to a step 109. If NO is output at the step 108, then other processing is executed and the process returns to the step 101, whereupon the step 101 and the following processes are executed. In the step 109, the character is displayed on the display row 71 of the block type character plate 68 and then the processing returns to the step 106. It is determined in the decision step 107 whether or not the "target block type character" area 57 is being touched with the point of the pen 3. If the "target block type character" area 57 is being touched with the point of the pen 3 as represented by YES at the step 107, a cursor F within the block type character plate 68 is moved into the "target block type character" area 57 in the form of a cursor 57a as shown in FIG. 5G, and the processing proceeds to a decision step 110. If NO is output at the step 107, then the processing proceeds to a decision step 111. It is determined in the decision step 111 whether an area other than the "target block type character" area 57 is being touched with the point of the pen 3 or not. If NO is output at the step 111, then other processing is executed, the process returns to the step 101, and the step 101 and the following steps of the program are repeated. If, on the other hand, YES is output at the step 111, then the processing proceeds to a step 112. In the step 112, a message "place cursor in block type character plate, touch page and tool you want to write and place cursor at that position and then push "write" key" is displayed on a "message" area 74, as shown in FIG. 5F.

In the next decision step 113, it is determined whether or not an "OK" button 74a within the "message" area 74 is pushed. If NO is output at the decision step 113, then the processing returns to the step 113 and this decision is repeated. If YES is output at the step 113, then the processing returns to the step 106 whereby the step 106 and the following steps are repeated.

Figure 5H:
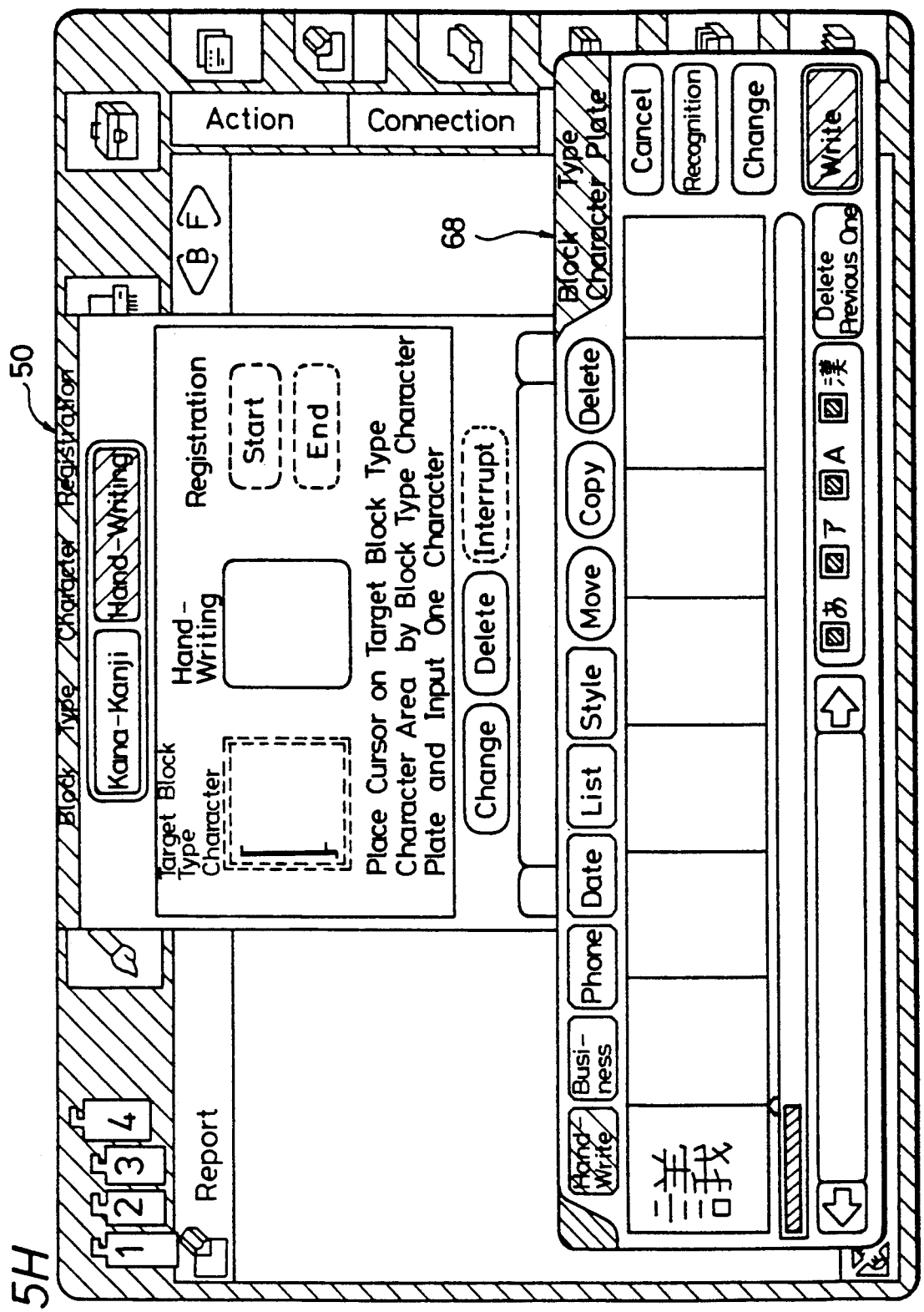
Figure 51:
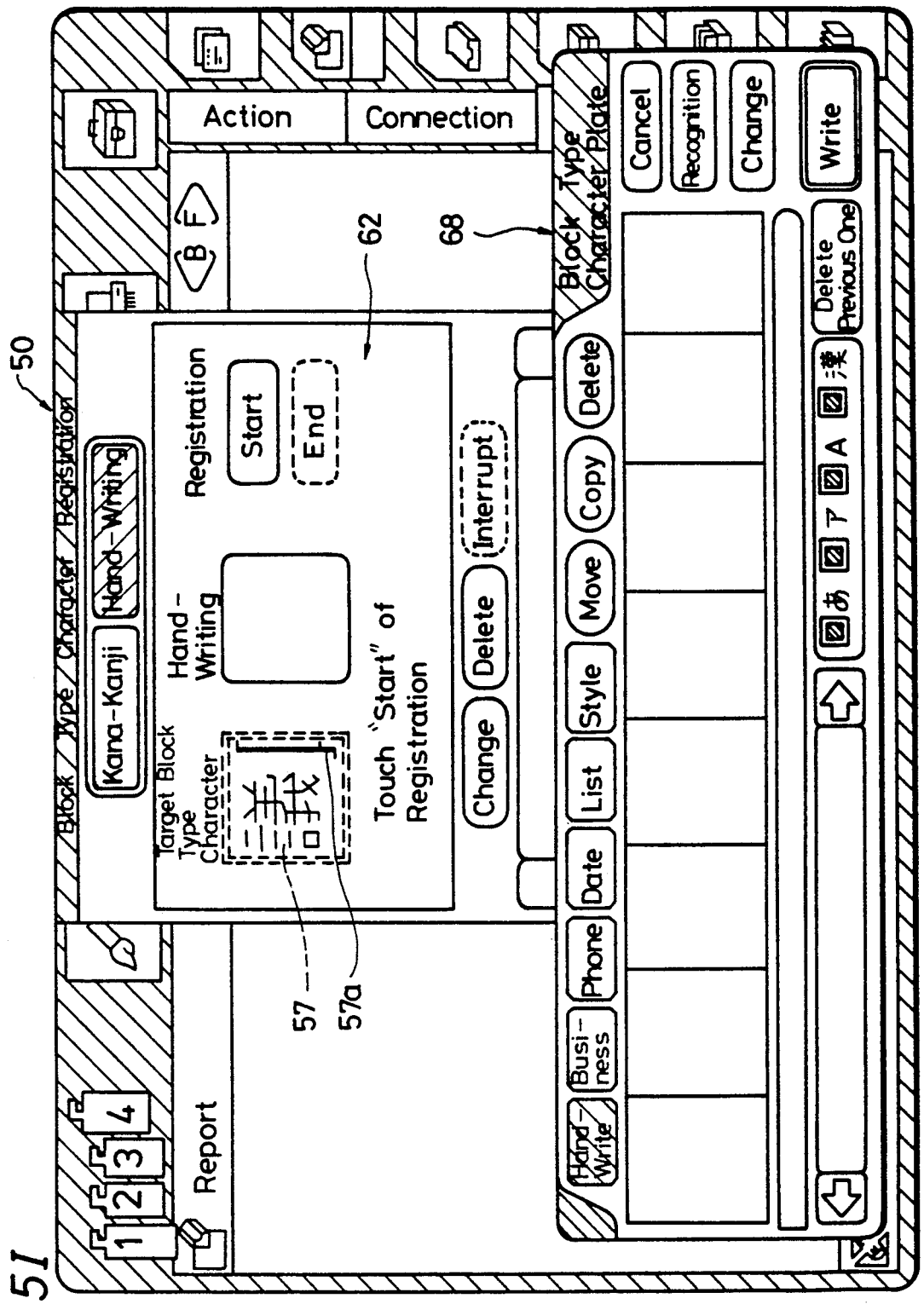
Figure 5J:
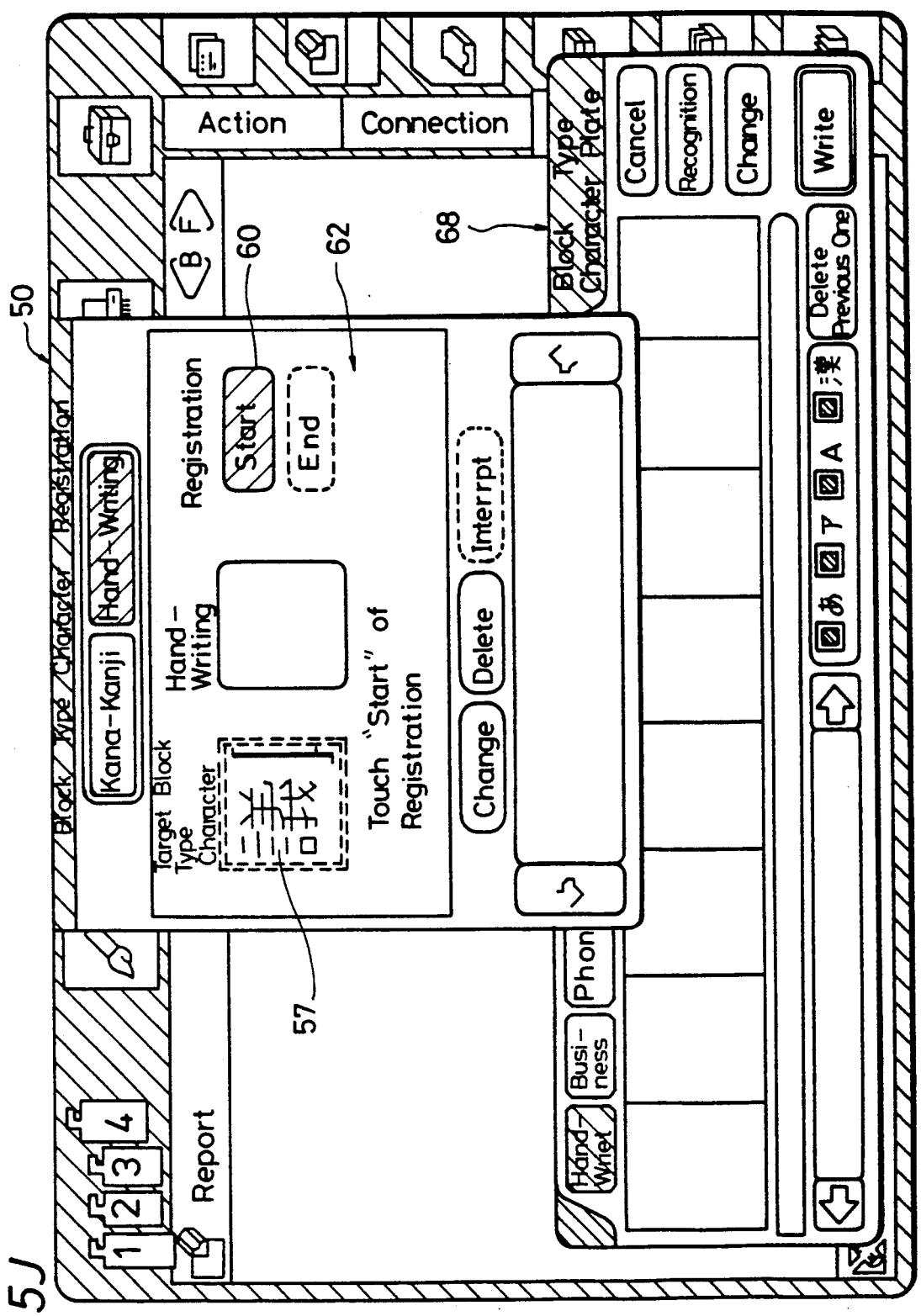
Figure 5K:
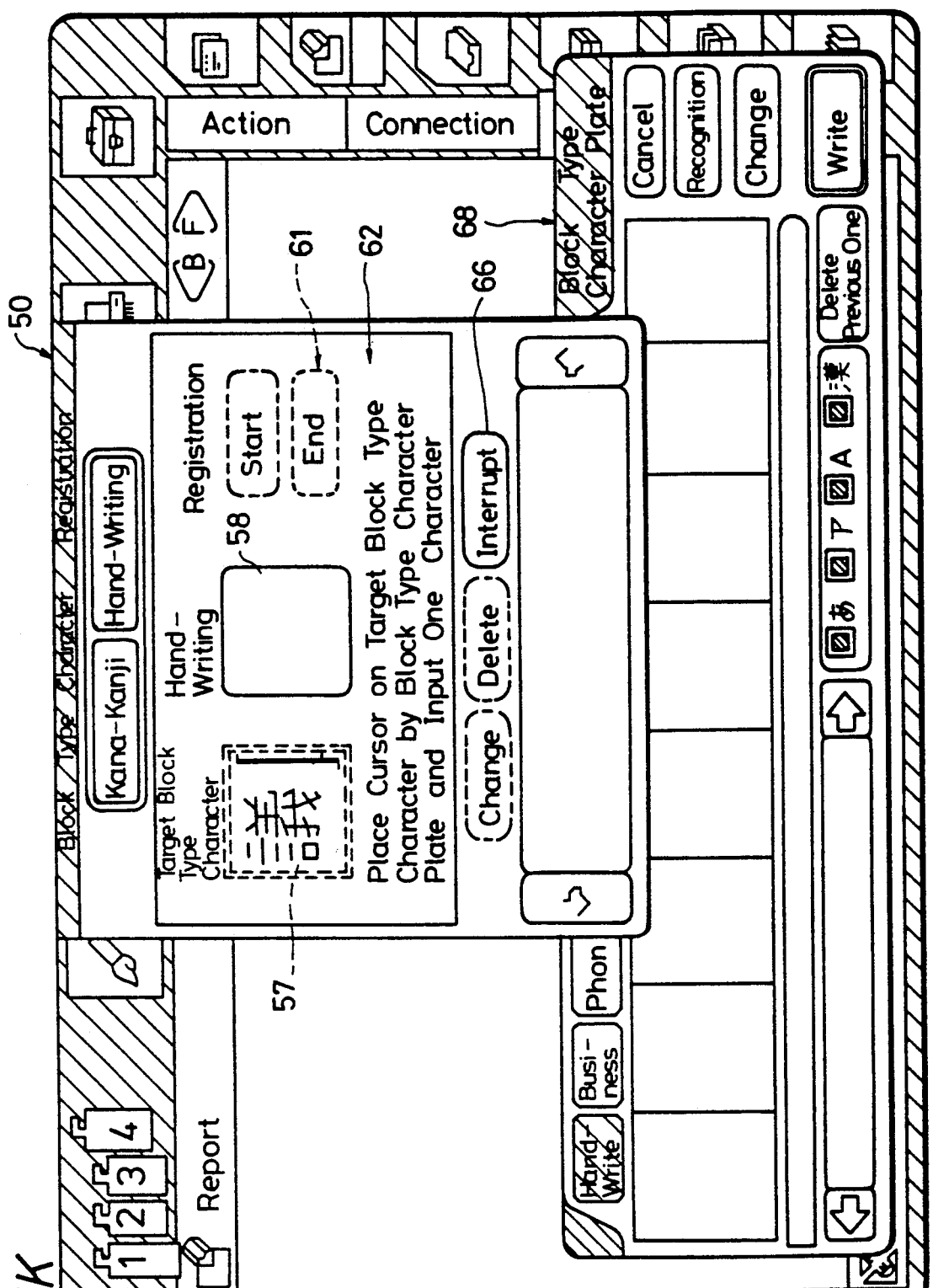

It is determined in the decision step 110 whether or not the character is displayed on the "display" row 71 of the block type character plate 68. If NO is output at the step 110, then the processing proceeds to a step 114, in which the processing in which a new paragraph mark is employed as the character on the "display" row 71 of the block type character plate 68 is executed under the control of the CPU 21, as shown in FIG. 5G. In that case, the block type character plate 68 is displayed so as to appear "underneath" the block type character registration plate 50. Then, the processing proceeds to a step 115. In the step 115, the character in the display row 71 of the block type character plate 68 is transferred to the "target block type character" area 57 under the control of the CPU 21, as shown in FIGS. 5H and 5I. Then, the processing proceeds to a step 116 in which a message "touch "START" of registration" is displayed on the "message" area 62 as shown in FIG. 5I.

Figure 2A:
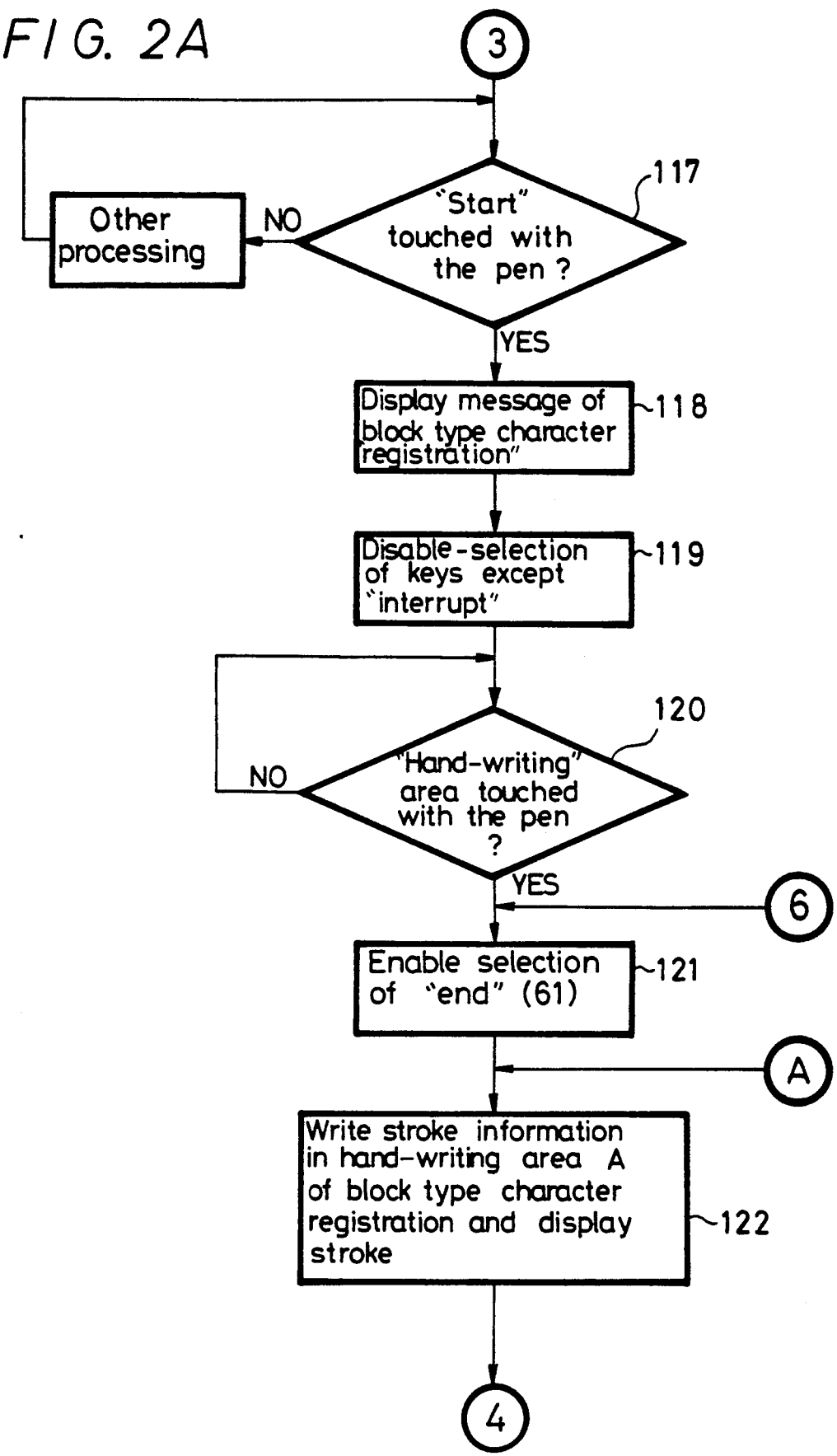
FIG. 2 (formed of FIGS. 2A, 2B and 2C) is a flowchart to which reference will be made in explaining the remainder of the operation in which the user hand-writing is registered in the user hand-writing dictionary.
Figure 2B:
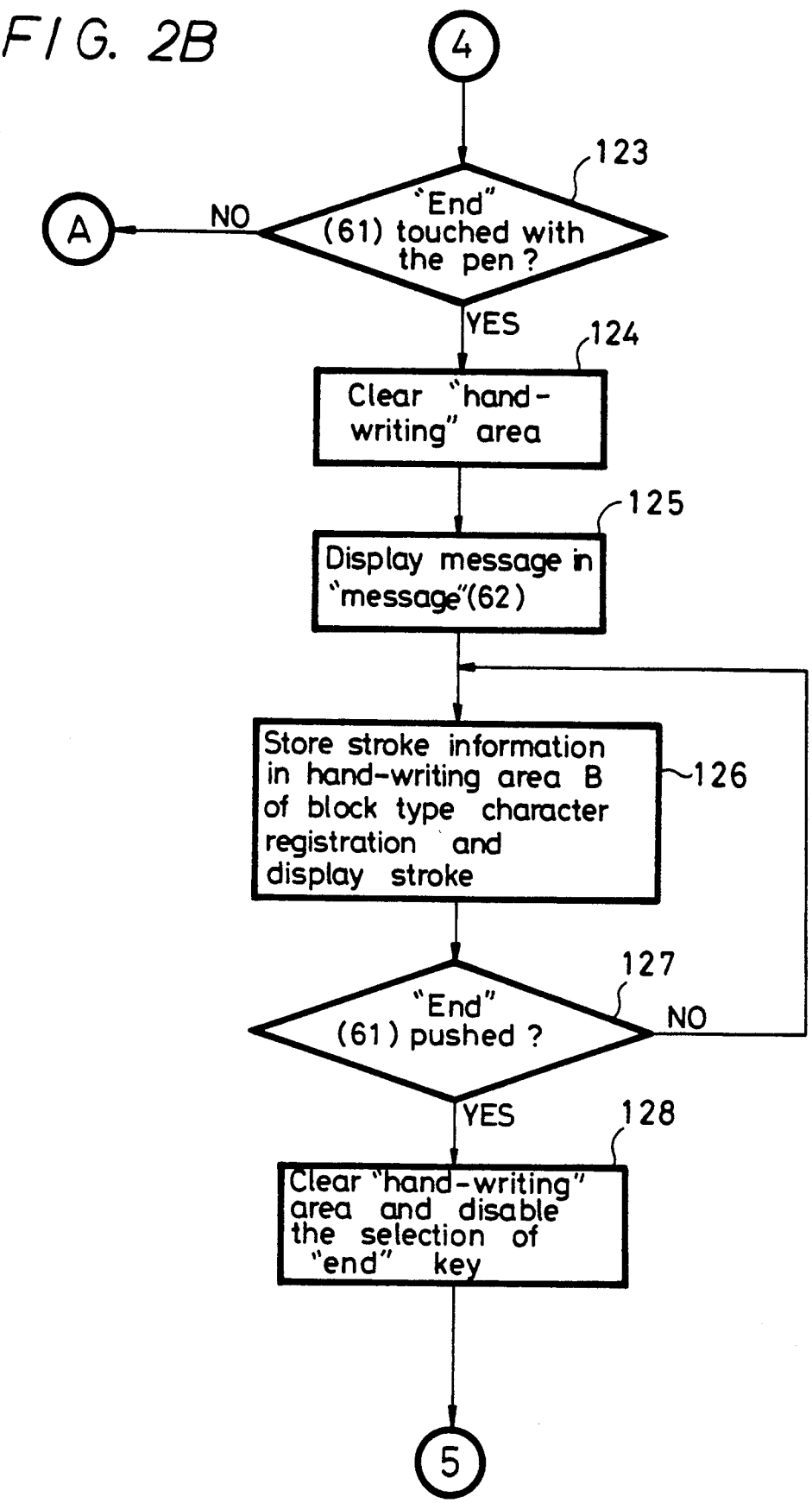
Figure 2C:
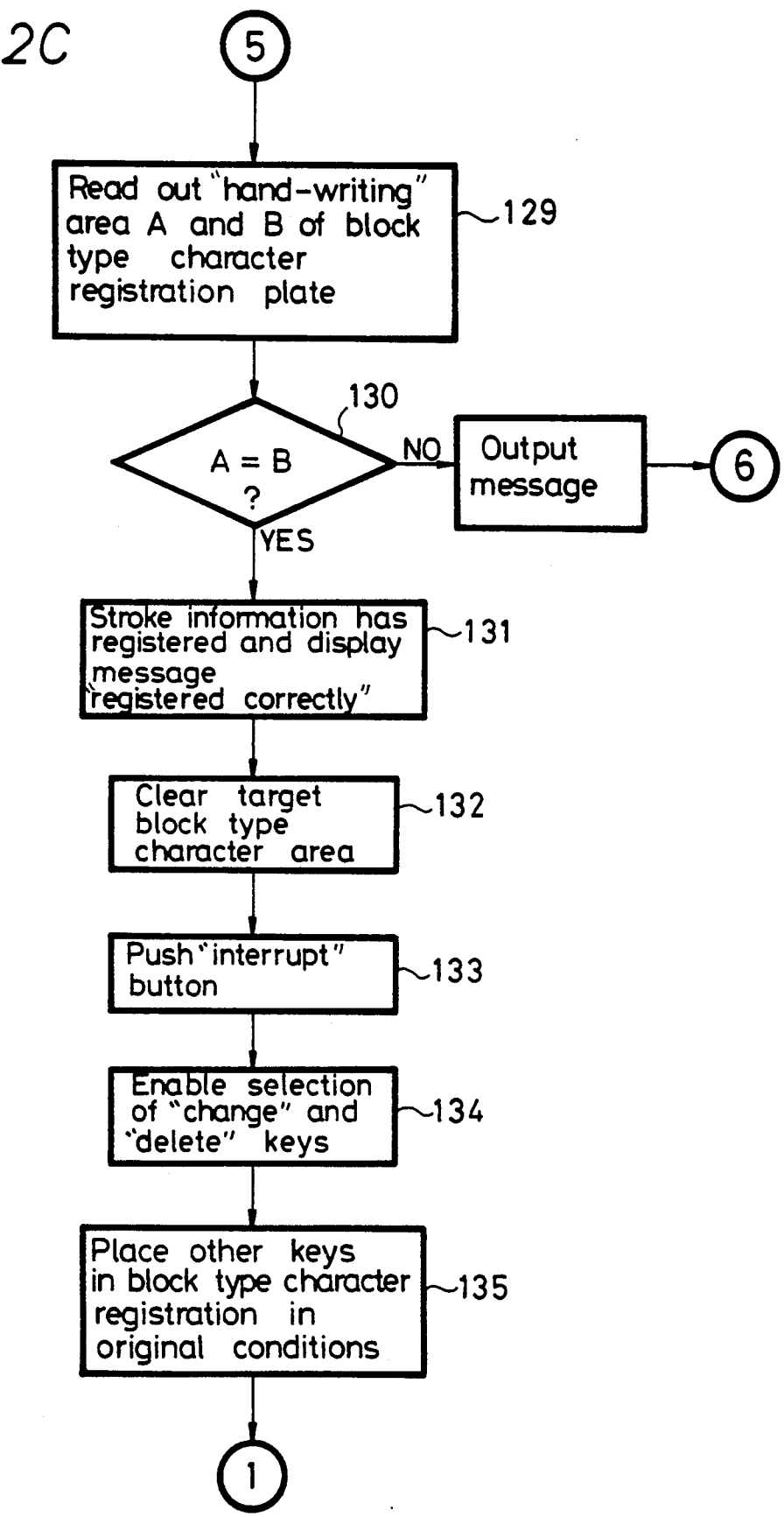
Figure 5L:
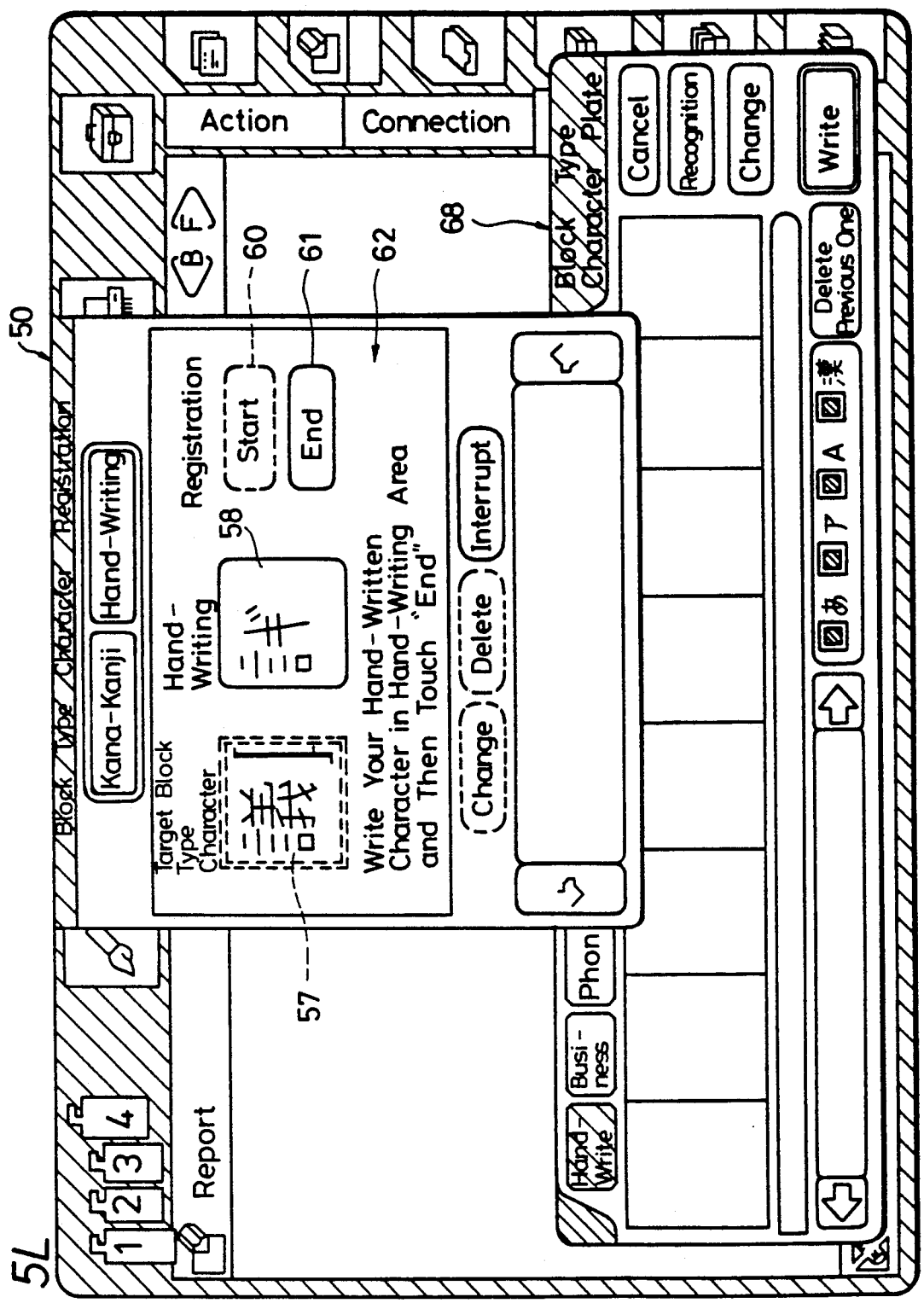
Figure 5M:
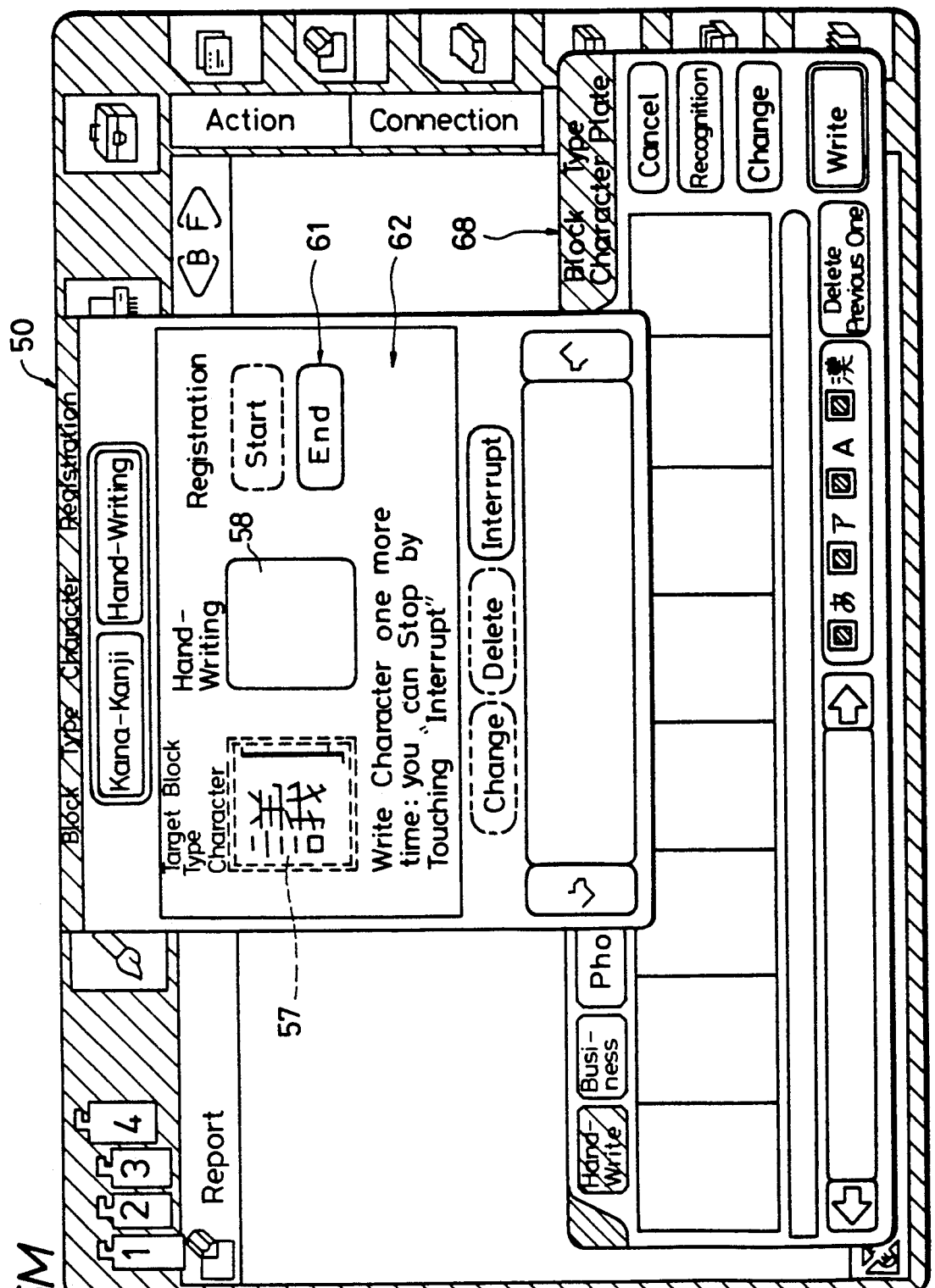
Figure 5N:
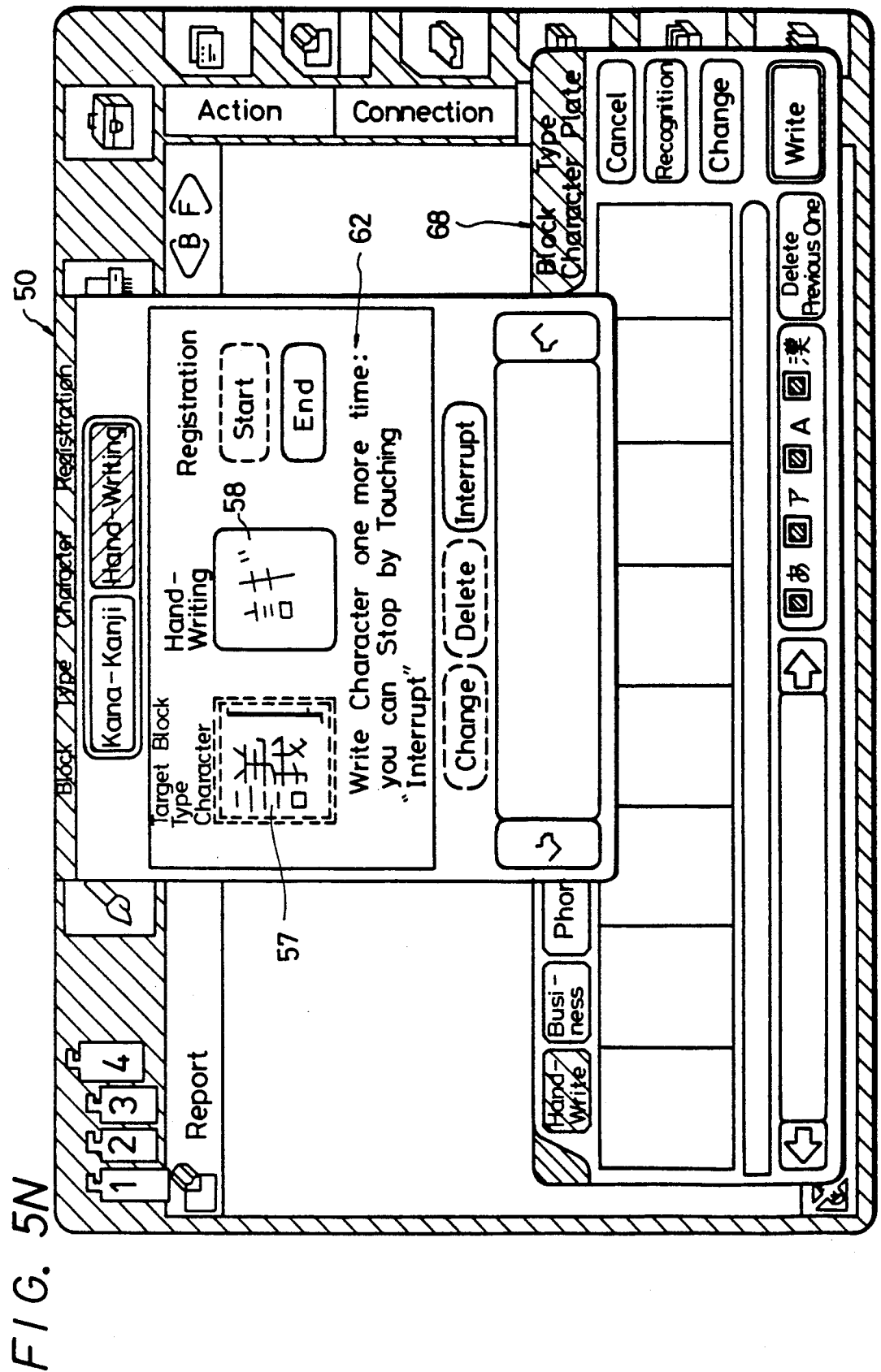
Figure 50:
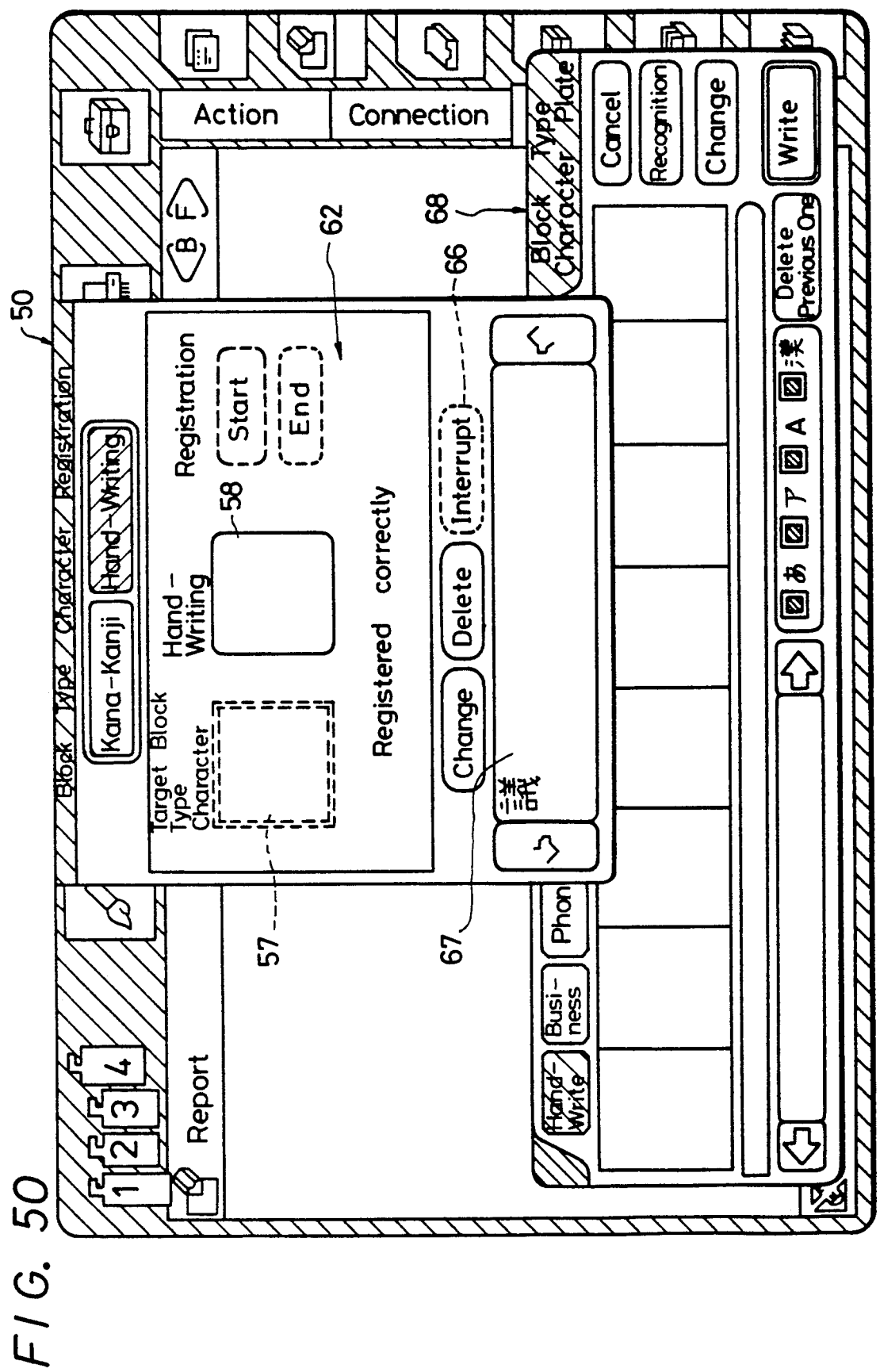

In the next decision step 117, shown in FIG. 2A, it is determined whether or not the "start" key area 60 is being touched with the point of the pen 3. If so, the display of the "start" key area 60 is covered with a half tone mesh. If NO is output at the step 117, then other processing is executed and the decision of the step 117 is repeated (see FIGS. 5I and 5J). If on the other hand YES is output at the step 117, then the processing proceeds to a step 118 in which a message "write your hand-written character in hand-writing area and then touch "END"" is displayed in the "message" area 62 under the control of the CPU 21, as shown in FIG. 5L. In a step 119, keys other than the "interrupt" key 66 are disabled. Then, the processing proceeds to the next decision step 120 in which it is determined whether or not the "hand-writing" key area 56 is being touched with the point of the pen 3. If NO is output at the step 120, then the processing returns to the step 120 and the decision is repeated. If YES is output at the step 120, then the processing proceeds to a step 121, wherein the selection of only the "end" key area 61 is enabled. In that case, the user writes a registered character in the "hand-writing" area 58 to represent that displayed on the "target block type character" area 57. For example, a simplified character may be drawn as illustrated in FIG. 5L. In the next step 122, stroke information, namely the simplified character shown in FIG. 5L, is written in a store area (address) A corresponding to the "hand-writing" area 58 of the block type character registration plate 50 of the V-RAM 30. Thereafter, in the next decision step 123, it is determined whether or not the "end" key area 61 is being touched with the point of the pen 3. If NO is output at the step 123, then the processing returns to the step 122 and the step 122 is repeated. If YES is output at the step 123, then the processing proceeds to a step 124 in which the "hand-writing" area 58 is cleared under the control of the CPU 21. In the next step 125, a message "write character one more time: you can stop by touching "interrupt"" is displayed in the "message" area 62 as shown in FIG. 5M. In the next step 126, the simplified character (see FIG. 5N) is hand-written a second time and the corresponding stroke information is written in a store area (address) B corresponding to the hand-writing of the block type character registration plate of the V-RAM 30. It is determined in the next decision step 127 whether or not the "end" key area is being touched with the point of the pen 3. If NO is output at the step 127, then the processing returns to the step 126 and the processing in the step 126 is repeated. If YES is output at the step 127, then the processing proceeds to a step 128 in which the "hand-writing" area 58 is cleared under the control of the CPU 21. In the next step 129, the store area A (corresponding to the first stroke information of the hand-writing area 58 of the block type character plate) and the store area B (corresponding to the second stroke information of the hand-writing area 58 of the block type character registration plate) stored in the V-RAM 30 are read out. In a decision step 130, similarity conditions of stroke order and shape of the hand-written characters are compared for the first and second hand-writing stages represented by the areas A and B by using, for example, a fuzzy logic theory. In this comparison, the similarity conditions of writing order, strokes and stroke patterns of each stroke of characters of the first and second hand-writing stages can be detected. Portions of information which are substantially the same in both first and second stages are stored in the backup RAM 25 as a single unit of information and information portions which are different in the first and second stages are registered in the backup RAM 25 as separate units of information. For example, while the character written in the "hand-writing" area 58 of FIGS. 5L and 5N has twelve strokes, if stroke information relating to nine of the strokes are the same in the first and second stages and three of the strokes are different, the stroke information relating to the three different strokes of the two patterns are stored separately. Thereafter, on the basis of the registered information, simple hand-written strokes may readily be recognized and converted into the corresponding block type character. If there are insufficient of the similar stroke patterns for similarity to be detected in the step 130, the processing for inputting stroke information is executed again. Accordingly, if the similarity conditions meet those which have been predetermined, as represented by YES at the step 130, then the processing proceeds to a step 131. If NO is output at the step 130, then a message "write character one more time" (not shown in the drawings) is displayed on the "message" area 62, and then the processing returns to the step 121, whereupon the step 121 and the following steps are repeated. In the step 131, a message "registered correctly" is displayed in the "message" area 62 (see FIG. 5O) and the registered character is displayed in the "registered block type character" area 67. In a step 132, the "target block type character" area 57 is cleared and in a following step 133, the selection of the "interrupt" key area 66 is disabled. In a step 134, the selection of the "change" and "delete" key areas 64, 65 is enabled. Further, in a following step 135, keys other than the "registration" keys 59 are set in the start mode under the control of the CPU 21, and then the process returns to the step 101, wherein a process for registering a new simplified character is initiated.

As described above, a selected character is designated as the target character, the hand-written information of the user (see FIG. 5L) is input twice and the similarity conditions thereof are detected. If the similarity conditions thereof meet predetermined criteria, the hand-written stroke is registered and the input of the succeeding hand-written stroke is converted into the registration object block type character. Therefore, the hand-written pattern for making the user hand-writing dictionary in the portable computer can be registered accurately and readily, thus making the edition more convenient.

Figure 6A:
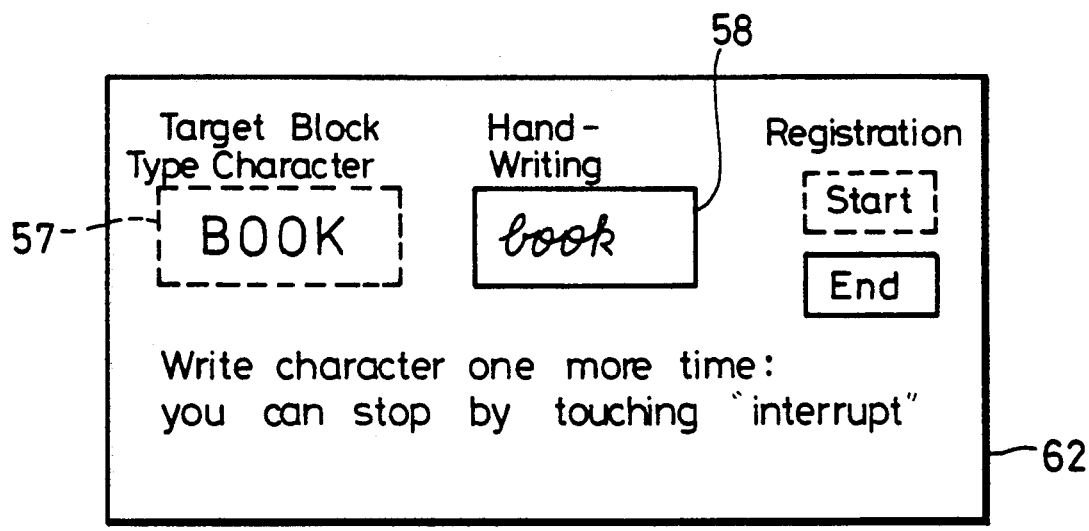
FIGS. 6A and 6B are schematic diagrams respectively used in explaining an operation in which one hand-written English word and one alphabet character are registered and converted into block type characters by the character recognition function.
Figure 6B:
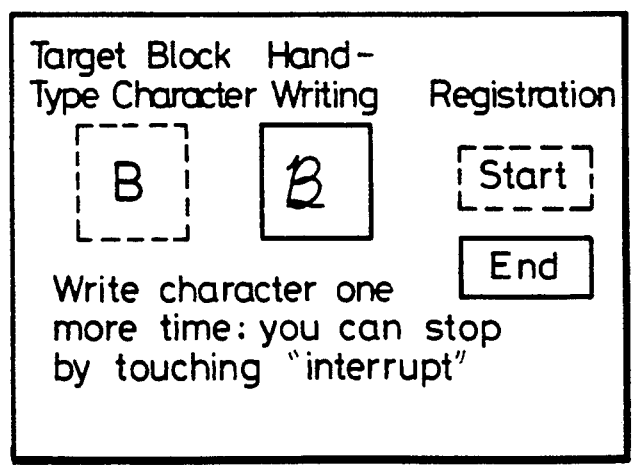

While the input of one character of a set of Japanese characters is given as the example in the aforementioned embodiment, similar results can also be provided when the registration of, for example, the regular hand-written Roman (for example, English) alphabet is converted into block type characters or the registration of a plurality of characters is performed. As, for example, shown in FIG. 6A, the word "BOOK" may be designated as the registration target block type character, by registering the user's hand-written characters a plurality of times on the "hand-writing" area 58; the hand-written character can then easily be converted into the corresponding block type character by the character recognition function, after registration. Alternatively, as mentioned above, one alphabet character, for example B, can be designated as a registration target block type character as shown in FIG. 6B.

While the hand-writing strokes of the user are input twice and similarity conditions therebetween are detected as described above, the number of hand-writing strokes is not necessarily limited to two inputs. For example, the hand-writing strokes of the user may be input three or more times, and if the hand-writing strokes of the user are complicated, the required number of inputs may be freely set by the user or may be increased, thus making it possible to detect similarity conditions more accurately.

As described above, according to the information processing apparatus embodying the present invention, the target block type character is designated and thereafter the user's hand-writing strokes are input a plurality of times. Then, similarity conditions between the various samples of hand-writing are detected. Thereafter, the hand-writing strokes are registered on the basis of the hand-writing having the predetermined similarity conditions and then on the basis of the input of the registered hand-writing strokes, the hand-writing character is converted into the corresponding block type character. Therefore, the hand-writing pattern for making the user hand-writing dictionary can be registered accurately and readily, which can make editing more convenient.

Further details of the general operation of an information processing apparatus as shown in FIG. 3 are given in European Patent Application Publication No. 0 373 961.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. An information processing apparatus with a hand-writing character recognition function, said apparatus comprising:

input arbitrary means comprising pen means and a tablet for inputting hand-writing character information of a user;

selecting means for selecting an arbitrary desired block type character on the basis of said hand-writing character information, selection of said block type character corresponding to said hand-writing character information being effected by said hand-writing character recognition function;

detecting means for detecting a similarity condition between first and second hand-written characters input by the user on said input means, said first and second hand-written characters relating to a particular block type character; and registering means for registering the user's hand-writing character information based on said first and second hand-written characters only in response to detection of said similarity condition by said detecting means, wherein after input by the user of a hand-written character similar to said user's registered hand-writing character information, the input hand-written character is translated into said desired block type character.

2. An information processing apparatus according to claim 1, further comprising a display means beneath said tablet, wherein an image displayed on said display means is visible through said tablet.

3. An information processing apparatus according to claim 2, wherein each of said hand-written characters is displayed on said display means in a real time manner when the user inputs each said hand-written character.

4. An information processing apparatus according to claim 1, wherein a mode for registering said user's hand-writing character information is selected by opening a registering window.

5. An information processing apparatus according to claim 4, wherein said registering window has a first area for displaying said desired block type character and a second area for inputting each said hand-written character by using said pen means.

6. An information processing apparatus according to claim 5, wherein said first area is used to display a word formed of Roman letters, and said second area is used to input a hand-written representation of the word.

7. An information processing apparatus according to claim 1, wherein said apparatus is a portable computer.

8. An information processing method using a hand-writing character recognition function, said method comprising the steps of:

selecting a desired block type character on the basis of input hand-writing character information, selection of said block type character corresponding to said hand-writing character information being effected by said hand-writing character recognition function;

inputting a first hand-written character by a user on input means;

inputting a second hand-written character by the user on said input means;

detecting a similarity condition between said first and second hand-written characters; and registering the user's hand-writing character information based on said first and second hand-written characters only in response to detection of said similarity condition, wherein after input by the user of a hand-written character similar to said user's registered hand-writing character information, the input hand-written character is translated into said desired block type character.

9. An information processing method according to claim 8, including the step of displaying each of said hand-written characters on a display means in a real time manner, as a user inputs them.

10. An information processing method according to claim 8, wherein the hand-written characters are input by writing with a pen means on a tablet.

11. An information processing apparatus using a handwriting character recognition function comprising:
   a) input means having pen means and a tablet for inputting handwriting trace information by a user;
   b) selecting means for selecting a desired block type character as an object of said handwriting trace information, said block type character corresponding to said handwriting trace information according to said handwriting character recognition function;
   c) detecting means for detecting a similarity condition between said first trace information input by said input means and a second trace information;
   d) registering means for registering said user's trace information based only on said first and second trace information in response to said detecting means; after that when said user inputs handwriting trace information similar to said user trace information, the input information is translated to said desired block type character;
   e) display means disposed under said tablet whereby an image on said display means is shown through said tablet;
   f) said trace information is displayed real-time on said display means when user inputs said trace information;
   g) said apparatus has a user trace information registering mode which is selected when a registering window is opened;
   h) said registering window has a first area for displaying said desired block type character information and a second area adjacent to said first area for inputting said trace information by using said pen means; and
   i) said registering window has a third area which is displayed for a block type character which is already registered.

* * * * *